US011100142B2

(12) United States Patent
Cruanes et al.

(10) Patent No.: US 11,100,142 B2
(45) Date of Patent: Aug. 24, 2021

(54) INCREASING CLUSTERING OF PARTITIONS OF A TABLE

(71) Applicant: Snowflake Inc., San Mateo, CA (US)

(72) Inventors: Thierry Cruanes, San Mateo, CA (US); Marcin Zukowski, San Mateo, CA (US); Benoit Dageville, San Mateo, CA (US); Jiaqi Yan, San Mateo, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/030,549

(22) Filed: Sep. 24, 2020

(65) Prior Publication Data

US 2021/0019335 A1    Jan. 21, 2021

Related U.S. Application Data

(63) Continuation of application No. 15/694,436, filed on Sep. 1, 2017, now Pat. No. 10,817,540.

(Continued)

(51) Int. Cl.
*G06F 16/00* (2019.01)
*G06F 16/28* (2019.01)
(Continued)

(52) U.S. Cl.
CPC .......... *G06F 16/285* (2019.01); *G06F 16/211* (2019.01); *G06F 16/2282* (2019.01); *G06F 16/245* (2019.01)

(58) Field of Classification Search
None
See application file for complete search history.

(56) References Cited

U.S. PATENT DOCUMENTS 5,442,778 A * 8/1995 Pedersen ............... G06F 16/355
5,448,727 A   9/1995 Annevelink
(Continued)

FOREIGN PATENT DOCUMENTS

AU    2017321966 A1    3/2019
CA    3035445 A1    3/2018
(Continued)

OTHER PUBLICATIONS

"U.S. Appl. No. 15/694,436, Advisory Action dated Jan. 16, 2020", 3 pgs.

(Continued)

*Primary Examiner* — Polina G Peach
(74) *Attorney, Agent, or Firm* — Schwegman Lundberg & Woessner, P.A.

(57) ABSTRACT

The subject technology creates one or more partitions based on changes to a table, at least one of the one or more partitions overlapping with respect to values of one or more attributes with at least one of another partition and a previous partition, the creating of the one or more partitions resulting in a decrease in a degree of clustering of the table. The subject technology determines, after creating the one or more partitions, that the degree of clustering of the table is below a clustering threshold, the clustering threshold corresponding to a clustering ratio, the clustering ratio determined by at least a proportion of rows in a layout of the table that satisfy an ordering criteria based at least in part a particular attribute of the one or more attributes. The subject technology increases the degree of clustering of the table by reclustering partitions of the table.

27 Claims, 8 Drawing Sheets

Related U.S. Application Data

(60) Provisional application No. 62/383,201, filed on Sep. 2, 2016.

(51) Int. Cl.
*G06F 16/21* (2019.01)
*G06F 16/245* (2019.01)
*G06F 16/22* (2019.01)
*G06F 17/00* (2019.01)

(56) References Cited

U.S. PATENT DOCUMENTS

| | | | |
|---|---|---|---|
| 5,758,146 A * | 5/1998 | Schiefer | G06F 16/20 707/715 |
| 5,832,182 A * | 11/1998 | Zhang | G06F 16/285 706/50 |
| 5,878,409 A * | 3/1999 | Baru | G06F 16/278 |
| 5,960,431 A | 9/1999 | Choy | |
| 6,185,666 B1 * | 2/2001 | Murray | G06F 3/0607 711/173 |
| 6,269,375 B1 * | 7/2001 | Ruddy | G06F 16/2282 |
| 6,295,367 B1 | 9/2001 | Crabtree et al. | |
| 6,449,612 B1 * | 9/2002 | Bradley | G06K 9/6221 |
| 6,748,393 B1 | 6/2004 | Kapoor et al. | |
| 7,295,970 B1 | 11/2007 | Gorin et al. | |
| 8,805,784 B2 | 8/2014 | Novik et al. | |
| 8,903,823 B1 | 12/2014 | Meir et al. | |
| 9,058,373 B2 | 6/2015 | Shmueli et al. | |
| 9,430,550 B2 | 8/2016 | Ziauddin et al. | |
| 9,489,443 B1 | 11/2016 | Muniswamy-reddy et al. | |
| 10,817,540 B2 | 10/2020 | Cruanes et al. | |
| 2002/0188601 A1 * | 12/2002 | Abdo | G06F 16/285 |
| 2003/0195898 A1 | 10/2003 | Agarwal et al. | |
| 2004/0243546 A1 * | 12/2004 | Mishra | G06K 9/6218 |
| 2005/0038784 A1 | 2/2005 | Zait et al. | |
| 2005/0187917 A1 * | 8/2005 | Lawande | G06F 16/24549 |
| 2005/0223046 A1 * | 10/2005 | Smith | G06F 16/2282 |
| 2005/0251511 A1 | 11/2005 | Shankar et al. | |
| 2006/0161517 A1 * | 7/2006 | Bhattacharjee | G06F 16/217 |
| 2006/0218123 A1 * | 9/2006 | Chowdhuri | G06F 16/24532 |
| 2008/0046454 A1 | 2/2008 | Basu et al. | |
| 2008/0201102 A1 | 8/2008 | Boettcher et al. | |
| 2008/0222104 A1 | 9/2008 | Stewart et al. | |
| 2008/0228783 A1 | 9/2008 | Moffat | |
| 2008/0235183 A1 | 9/2008 | Draese et al. | |
| 2008/0256029 A1 | 10/2008 | Abrink | |
| 2009/0216692 A1 | 8/2009 | Saito et al. | |
| 2010/0011013 A1 | 1/2010 | Singh | |
| 2010/0030995 A1 | 2/2010 | Wang et al. | |
| 2010/0106723 A1 | 4/2010 | Lee | |
| 2010/0153431 A1 | 6/2010 | Burger | |
| 2010/0281013 A1 | 11/2010 | Graefe | |
| 2011/0099205 A1 * | 4/2011 | Shmueli | G06F 16/81 707/797 |
| 2011/0299786 A1 | 12/2011 | Kazama et al. | |
| 2012/0005209 A1 | 1/2012 | Rinearson et al. | |
| 2013/0096835 A1 | 4/2013 | Chok et al. | |
| 2013/0124474 A1 | 5/2013 | Anderson | |
| 2013/0151491 A1 * | 6/2013 | Gislason | G06F 16/2282 707/696 |
| 2013/0198218 A1 | 8/2013 | Wu et al. | |
| 2013/0204990 A1 | 8/2013 | Skjolsvold et al. | |
| 2013/0325848 A1 | 12/2013 | Daud et al. | |
| 2014/0058682 A1 | 2/2014 | Nasu et al. | |
| 2014/0075002 A1 | 3/2014 | Pradhan et al. | |
| 2014/0095502 A1 | 4/2014 | Ziauddin et al. | |
| 2014/0280143 A1 | 9/2014 | Milenova et al. | |
| 2014/0359771 A1 * | 12/2014 | Dash | H04L 63/1408 726/23 |
| 2015/0134678 A1 * | 5/2015 | Hu | G06F 16/22 707/756 |
| 2015/0234914 A1 | 8/2015 | Dageville et al. | |
| 2016/0026667 A1 | 1/2016 | Mukherjee et al. | |
| 2016/0103958 A1 * | 4/2016 | Hebert | G06F 16/285 707/737 |
| 2016/0299961 A1 * | 10/2016 | Olsen | G06K 9/6219 |
| 2016/0350392 A1 | 12/2016 | Rice et al. | |
| 2016/0350774 A1 | 12/2016 | Brooks et al. | |
| 2017/0076187 A1 | 3/2017 | Nakane | |
| 2017/0116315 A1 * | 4/2017 | Xiong | G06F 16/2228 |
| 2017/0154280 A1 * | 6/2017 | Adir | G06F 16/906 |
| 2018/0039695 A1 | 2/2018 | Chalabi et al. | |
| 2018/0068008 A1 | 3/2018 | Cruanes et al. | |
| 2018/0165380 A1 * | 6/2018 | Shibayama | G06F 3/064 |
| 2021/0019336 A1 | 1/2021 | Cruanes et al. | |

FOREIGN PATENT DOCUMENTS

| | | |
|---|---|---|
| CN | 110100242 A | 8/2019 |
| DE | 202017007212 U1 | 2/2020 |
| EP | 3507724 A1 | 7/2019 |
| JP | 2013080403 A | 5/2013 |
| JP | 2014225260 A | 12/2014 |
| WO | WO-2018045372 A1 | 3/2018 |

OTHER PUBLICATIONS

"U.S. Appl. No. 15/694,436, Examiner Interview Summary dated Oct. 15, 2019", 3 pgs.

"U.S. Appl. No. 15/694,436, Final Office Action dated Nov. 8, 2019", 12 pgs.

"U.S. Appl. No. 15/694,436, Non Final Office Action dated Sep. 6, 2019", 16 pgs.

"U.S. Appl. No. 15/694,436, Notice of Allowance dated Mar. 16, 2020", 10 pgs.

"U.S. Appl. No. 15/694,436, Notice of Allowance dated Aug. 7, 2020", 9 pgs.

"U.S. Appl. No. 15/694,436, Response filed Jan. 7, 2020 to Final Office Action dated Nov. 8, 2019", 15 pgs.

"U.S. Appl. No. 15/694,436, Response filed Feb. 10, 2020 to Advisory Action dated Jan. 16, 2020", 15 pgs.

"U.S. Appl. No. 15/694,436, Response filed Oct. 16, 2019 to Non-Final Office Action dated Sep. 6, 2019", 18 pgs.

"Australian Application Serial No. 2017321966, Examination Report dated Jun. 19, 2020", 5 pgs.

"Chinese Application Serial No. 201780067721.6, Voluntary Amendment filed Dec. 16, 2019", with English translation of claims, 27 pgs.

"European Application Serial No. 17847680.0 Response filed Oct. 22, 2019 to Communication Pursuant to Rulesd 161 (2) and 162 EPC dated Apr. 12, 2019", 31 pgs.

"European Application Serial No. 17847680.0, Extended European Search Report dated Mar. 5, 2020", 12 pgs.

"European Application Serial No. 17847680.0, Response filed Sep. 10, 2020 to Extended European Search Report dated Mar. 5, 2020", 12 pgs.

"International Application Serial No. PCT/US2017/050075, International Preliminary Report on Patentabilty dated Mar. 14, 2019", 10 pgs.

"International Application Serial No. PCT/US2017/050075, International Search Report dated Nov. 13, 2017", 2 pgs.

"International Application Serial No. PCT/US2017/050075, Written Opinion dated Nov. 13, 2017", 8 pgs.

"Oracle Partitioning", [Online]. Retrieved Oct. 16, 2019 from the Internet: <URL: https://web.archive.org/web/20160918182300/https://www.oracle.com/database/partitioning/index.html>, (internally dated 2016), 3 pgs.

"The Teradata Partitioned Primary Index (PPI)", [Online]. Retrieved Oct. 16, 2019 from the Internet: <URL: http://www.dwhpro.com/teradata-partitioned--primary-index>, (internally dated Oct. 18, 2014), 9 pgs.

"Zone Maps", IBM, [Online]. Retrieved Oct. 16, 2019 from the Internet: <URL: https://www.ibm.com/support/knowledgecenter/en/SSULQD_7.2.1/com.ibm.nz.adm.doc/c_sysadm_zone_maps.html1>, (internally dated Apr. 13, 2016), 1 pg.

(56) References Cited

OTHER PUBLICATIONS

"Zone Maps and Attribute Clustering", Oracle, [Online]. Retrieved Oct. 16, 2019 from the Internet: <URL: https://web.archive.org/web/20160402130034/https://docs.oracle.com/database/121/DWHSG/zone_maps.htm>. (internally dated 2016), 18 pgs.

Anonymous, "Understanding Micro-partitions and Data Clustering", [Online]. Retrieved from the Internet: <URL: https://support.snowflake.net/s/articl e/understanding-micro-partitions-and-data-clustering>, (May 19, 2017), 7 pgs.

Lughofer, Edwin, et al., "Autonomous data stream clustering implementing split-and-merge concepts—Towards a plug-and-play approach", Information Sciences 304, (2015), 54-79.

Michael, Klos, "Faster Snowflake Queries through Clustering", [Online]. Retrieved from the Internet: <URL: https://eng.localytics.com/faster-snow flake-queries-through-clustering/>, (Mar. 13, 2017), 1-9.

Ozar, Brent, "An Introduction to Hive's Partitioning", [Online]. Retrieved Oct. 16, 2019 from the Internet: <URL: https://web.archive.org/web/201609002075134/https://www.brentozar.com/archive/2013/03/introduction-to-hive-partitioning>, (internally dated Mar. 14, 2013), 5 pgs.

Swaminathan, Gandhi, "Strategies for Partitioning Relational Data Warehouses in Microsoft SQL Server", [Online]. Retrieved Oct. 16, 2019 from the Internet: <URL: https://technet.microsoft.com/en-us/library/cc966457.aspx>, (internally dated Feb. 17, 2005), 14 pgs.

U.S. Appl. No. 15/694,436 U.S. Pat. No. 10,817,540, filed Sep. 1, 2017, Incremental Clustering Maintenance of a Table.

U.S. Appl. No. 17/030,565, filed Sep. 24, 2020, Maintaining States of Partitions of a Table for Reclustering.

"U.S. Appl. No. 17/030,565, Non Final Office Action dated Dec. 3, 2020", 14 pgs.

"Australian Application Serial No. 2017321966, Response filed Jan. 4, 2021 Examination Report dated Jun. 19, 2020", 137 pgs.

"Canadian Application Serial No. 3,035,445, Office Action dated Dec. 3, 2020", 4 pgs.

"European Application Serial No. 17847680.0, Communication Pursuant to Article 94(3) EPC dated Jan. 19, 2021", 9 pgs.

"Japanese Application Serial No. 2019-511705, Notification of Reasons for Refusal dated Dec. 1, 2020", 6 pgs.

"U.S. Appl. No. 17/030,565 312 Amendment filed Mar. 31, 2021", 8 pgs.

"U.S. Appl. No. 17/030,565, Notice of Allowance dated Mar. 11, 2021", 10 pgs.

"U.S. Appl. No. 17/030,565, PTO Response to Rule 312 Communication dated Apr. 6, 2021", 2 pgs.

"U.S. Appl. No. 17/030,565, Response filed Mar. 3, 2021 to Non Final Office Action dated Dec. 3, 2020", 11 pgs.

"Canadian Application Serial No. 3,035,445, Response filed Mar. 22, 2021 to Office Action dated Dec. 3, 2020", 52 pgs.

"Japanese Application Serial No. 2019-511705, Response filed Feb. 26, 2021 to Notification of Reasons for Refusal dated Dec. 1, 2020", w/o English Translation, 10 pgs.

Andersen, et al., "Overlapping Clusters for Distributed Computation", ACM, (2012).

* cited by examiner

300

| id | name | country | date |
|----|------|---------|------|
| 2 | A | UK | 11/2 |
| 4 | C | SP | 11/2 |
| 3 | C | DE | 11/2 |
| 2 | B | DE | 11/2 |
| 3 | A | FR | 11/2 |
| 2 | C | SP | 11/2 |
| 3 | Z | DE | 11/2 |
| 2 | B | UK | 11/2 |
| 4 | C | NL | 11/2 |
| 5 | X | FR | 11/3 |
| 1 | A | NL | 11/3 |
| 5 | A | FR | 11/3 |
| 2 | X | FR | 11/2 |
| 4 | Z | NL | 11/2 |
| 2 | Y | SP | 11/2 |
| 1 | B | SP | 11/3 |
| 5 | X | DE | 11/3 |
| 3 | A | UK | 11/4 |
| 1 | C | FR | 11/3 |
| 4 | Z | NL | 11/4 |
| 5 | Y | SP | 11/4 |
| 5 | B | SP | 11/5 |
| 3 | X | DE | 11/5 |
| 2 | Z | UK | 11/5 |

INCREASING CLUSTERING OF PARTITIONS OF A TABLE

CROSS-REFERENCE TO RELATED APPLICATIONS

The present application is a continuation of, and hereby claims priority under 35 U.S.C. § 120 to U.S. Non-Provisional patent application Ser. No. 15/694,436, entitled "INCREMENTAL CLUSTERING MAINTENANCE OF A TABLE," filed on Sep. 1, 2017, which claims the benefit of U.S. Provisional Application Ser. No. 62/383,201, entitled "INCREMENTAL CLUSTER MAINTENANCE OF A TABLE," filed Sep. 2, 2016, where the disclosure of each is incorporated herein by reference in their entireties for all purposes.

TECHNICAL FIELD

The present disclosure relates to databases and more particularly relates to incremental clustering maintenance of data in a database or table.

BRIEF DESCRIPTION OF THE DRAWINGS

Non-limiting and non-exhaustive implementations of the present disclosure are described with reference to the following figures, wherein like reference numerals refer to like or similar parts throughout the various views unless otherwise specified. Advantages of the present disclosure will become better understood with regard to the following description and accompanying drawings where:

FIG. 3 is a schematic diagram illustrating the logical structure of a table, according to one embodiment;

FIG. 4 is a schematic diagram illustrating the physical structure of the table of FIG. 3 in memory, according to one embodiment;

FIG. 6 is a schematic diagram illustrating the physical structure of the table of FIG. 3 in memory after reclustering, according to one embodiment;

DETAILED DESCRIPTION

Figure 1:
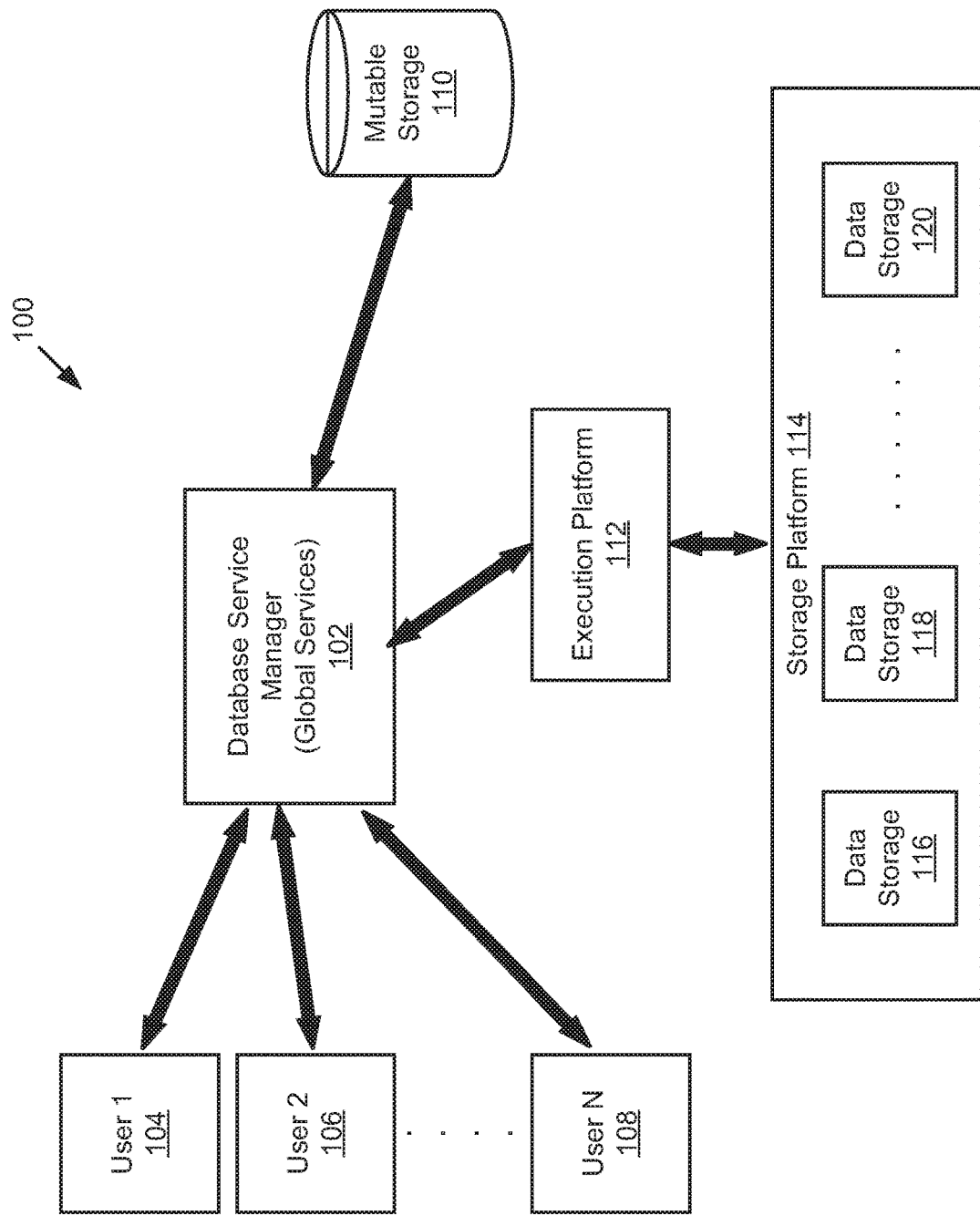
FIG. 1 is a block diagram illustrating a processing platform for a database system according to an example embodiment of the systems and methods described herein.

Databases are widely used for data storage and access in computing applications. Databases may include one or more tables that include or reference data that can be read, modified, or deleted using queries. Querying very large databases and/or tables might require scanning large amounts of data. Reducing the amount of data scanned is one of the main challenges of data organization and processing.

We define a table as a collection of records (rows). Each record contains a collection of values of table attributes (columns). Tables are typically physically stored in multiple smaller (varying size or fixed size) storage units, e.g. files or blocks. These files or blocks may be part of different partitions of the table. We define partitioning as physically separating records with different data to separate data partitions. For example, a table can partition data based on the date attribute (or column), resulting in per day partitions, or based on the country attribute (or column), resulting in a per-country partition.

Data warehouse systems routinely use partitioning to split those large tables into manageable chunks of data. The ability to eliminate partitions (partition pruning) based on predicates specified by the query may result in dramatic reduction of the IO volume and is key to maintain acceptable performance of those systems.

Static partitioning is traditionally used in the data warehouse space. Some examples of partitioning support include: Oracle® partitioning (see e.g., "Oracle Partitioning" at https://www.oracle.com/database/partitioning/index.html); Hive® partitioning (see e.g., "An Introduction to Hive's Partitioning" at https://www.brentozar.com/archive/2013/03/introduction-to-hive-partitioning); SQL Server® table partitioning (see e.g., "Strategies for Partitioning Relational Data Warehouses in Microsoft SQL Server" at https://tech-net.microsoft.com/en-us/library/cc966457.aspx); and Teradata® partitioning (see e.g., "The Teradata Partitioned Primary Index (PPI)" at http://www.dwhpro.com/teradata-partitioned-primary-index).

In many cases, a large table is partitioned as manually specified by a database administrator. For example, the administrator may provide the number of partitions and/or the partitioning keys. However, in order to manually specify these details, the administrator needs to have a good understanding of the query workload to select the correct partitioning keys. Also, the number of partitioning keys is typically limited as it directly translates into a fragmentation of the physical storage. Additionally, maintaining partitions is typically very expensive in terms of computation power and time.

A related concept to partitioning is clustering or ordering. Ordering (using a set of ordering key attributes or columns) orders the data according to the values of these key attributes. Clustering may be defined as physically grouping records (or rows) together that have values that are close together. For example, rows sharing the same keys may be put next to each other. Ordering according to a set of keys is a common approach to achieve clustering based on those keys. The values sharing the same key may be next to each other, but the groups sharing the same key or close keys do not need to be adjacent. From now on, we may use the term "ordering" where the terms or concepts of "clustering" or "partial ordering" could also be applied. These concepts differ from partitioning as they do not introduce separate physical entities—it is possible to order data for the entire table, or e.g. within a partition.

When data is ordered, there are methods and structures that may be used to provide benefits similar to partitioning. For example, zone maps (also known as "min-max indices" or "small materialized aggregates") along with attribute clustering or sorting is another means to achieve many of the partitioning benefits. See for example "Zone Maps" at (http://www.ibm.com/support/knowledgecenter/

SSULQD_7.2.0/-com.ibm.nz.adm.doc/c_sysadm_zone_maps.html) and "Zone Maps and Attribute Clustering" at (https://docs.oracle.com/database/121/DWHSG/zone_maps.htm#-DWHSG9357). However, these systems or methods either do not try to maintain or optimize the clustering of the underlying data or require global and complete re-clustering of the underlying table.

Another approach for partitioning is indexing combined with zone maps, implemented e.g. by Netezza. In this approach, the strict ordering of values results in zone-maps delivering much better performance on filters on the ordering columns.

In light of the foregoing, Applicants have developed systems, methods, and devices for incremental maintenance of the partial ordering of a table. A table is defined as clustered based on a certain order-preserving function which takes data in each row as input if rows that are close in evaluation of this function are also close together in their physical ordering. The degree of clustering (clustering ratio) of a table is determined by the proportion of rows in the physical layout of the table that satisfy such ordering criteria. Perfect clustering is achieved when for any two rows in the table that are adjacent in their physical layout, no third row can be found that yield a closer distance to both rows according to the ordering function. For partitioned tables, clustering improves the probability that rows closer according to the ordering function should reside in the same partition.

Embodiments disclosed herein may be applied to data or tables in a database. By keeping data clustered, multiple database operations can be improved. Embodiments may include the ability to skip large chunks of data that are in different partitions, improved filtering and joins, as well as improved data manipulation language (DML) operations efficiency. As an example of improved filtering, when a query is received a large amount of data in different partitions may be filtered out based on query predicates. As an example of improved join operations, a probe table may be better pruned based on statistics of the build table. Also, DML operations such as delete can be performed more efficiently as large number of partitions that fully satisfy the search conditions can be deleted without reading each individual row.

Embodiments may also include the ability to introduce longer sequences of repeated values by keeping data clustered. For example, projections may be more efficient because a function may be computed once for thousands of identical values. Additionally, joins and aggregations may be improved by performing a lookup in a hash table once for thousands of identical values. Embodiments may also include the ability of identifying non-overlapping data subsets to enable determining smaller subsets of data that can be joined together or doing partial aggregations of data. Embodiments with sorted data may allow for partial ordered aggregations or merge joins.

Existing technologies for maintaining perfect clustering for a table are available. For example, Teradata, referenced above, uses indexes to keep data fully sorted. Upon insert the index is incrementally updated to enforce the global ordering. Redshift maintains partitions (zone maps) and provide global reordering operations to restore perfect clustering for the table. As illustrated previously, both are expensive because they try to maintain those data structures exactly sorted or partitioned.

In one embodiment, rather than always maintaining perfect clustering, embodiments of the systems, methods, and devices disclosed herein may allow for some amount of imperfect (partial) clustering. Furthermore, when reclustering is performed, only improvement in clustering/partitioning is desired and perfect clustering is not required to be the result. Incremental improvement of clustering, or the allowance for imperfect but partial clustering is henceforth referred to herein as incremental clustering. Incremental clustering does not try to achieve perfect clustering of the underlying table on the clustering keys but rather optimizes the clustering ratio over time. For example, embodiments disclosed herein present the concept of "good enough" ordering or partitioning. At least one embodiment disclosed herein allows a smooth tradeoff between the cost of inserting/updating data versus the speed of querying, and also allows postponing some expensive operations or doing them in the background, without limiting data availability. For example, a system or method may use metrics to determine how well clustered a table is and then performing incremental reclustering operations to improve clustering without necessarily achieving perfect clustering.

In at least one embodiment, an administrator is not required to specify the number of partitions and/or keys for partitioning (clustering) of a table, and thus no up-front knowledge of the domain or a persistent global state is needed. For example, the system or method may automatically generate and determine partitions based on information about a data domain, range, and/or width/distance using simple statistics of the underlying data. One predetermined constraint on partitions may include a partition size. In one embodiment, algorithms disclosed herein choose subsets of data that provide most value (e.g., in query performance) if they get reclustered. In one embodiment, a system or method may determine additional information to be introduced in the underlying data statistics to improve the clustering efficiency. Additionally, incremental maintenance of clustering can be done online as part of the DML workload and/or offline as part of a background process. Furthermore, any data organization where ordering is important can possibly benefit from this technique. For example, this could be an alternative to many areas where LSMT is used.

A detailed description of systems and methods consistent with embodiments of the present disclosure is provided below. While several embodiments are described, it should be understood that this disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments may be practiced without some or all of these details. Moreover, for the purpose of clarity, certain technical material that is known in the related art has not been described in detail in order to avoid unnecessarily obscuring the disclosure.

As used herein the term partition is given to mean a logical division of data, such as the data of a table or database. As used herein the term clustering is given to describe the clustering properties or organization of partitions or micro-partitions, which are discussed further below. Additionally, the present disclosure discusses embodiments where partitions include a file or one or more files. However, each partition may include one file, two files, or data corresponding to columns, rows, and/or cells of a database or table. Each "file" may also be replaced with two or more separate files. In one embodiment, a partition may include a plurality of files that may be independently accessed or loaded without accessing a separate file even in the same partition.

Turning to FIG. 1, a block diagram is shown illustrating a processing platform 100 for providing database services, according to one embodiment. In one embodiment, the processing platform 100 may store and maintain database tables using incremental clustering maintenance, as discussed herein. The processing platform 100 includes a database service manager 102 that is accessible by multiple users 104, 106, and 108. The database service manager 102 may also be referred to herein as a resource manager or global services. In some implementations, database service manager 102 can support any number of users desiring access to data or services of the processing platform 100. Users 104-108 may include, for example, end users providing data storage and retrieval queries and requests, system administrators managing the systems and methods described herein, software applications that interact with a database, and other components/devices that interact with database service manager 102.

The database service manager 102 may provide various services and functions that support the operation of the systems and components within the processing platform 100. Database service manager 102 has access to stored metadata associated with the data stored throughout data processing platform 100. The database service manager 102 may use the metadata for optimizing user queries. In some embodiments, metadata includes a summary of data stored in remote data storage systems as well as data available from a local cache (e.g., a cache within one or more of the clusters of the execution platform 112). Additionally, metadata may include information regarding how data is organized in the remote data storage systems and the local caches. Metadata allows systems and services to determine whether a piece of data needs to be processed without loading or accessing the actual data from a storage device.

As part of the data processing platform 100, metadata may be collected when changes are made to the data using a data manipulation language (DML), which changes may be made by way of any DML statement. Examples of manipulating data may include, but are not limited to, selecting, updating, changing, merging, and inserting data into tables. Table data for a single table may be partitioned or clustered into various partitions. As part of the processing platform 100, files or partitions may be created and the metadata may be collected on a per file, per partition, and/or a per column basis. This collection of metadata may be performed during data ingestion or the collection of metadata may be performed as a separate process after the data is ingested or loaded. In an implementation, the metadata may include a number of distinct values; a number of null values; and a minimum value and a maximum value for each file, partition, or column. In an implementation, the metadata may further include string length information and ranges of characters in strings.

Database service manager 102 is further in communication with an execution platform 112, which provides computing resources that execute various data storage and data retrieval operations. The execution platform 112 may include one or more compute clusters. The execution platform 112 is in communication with one or more data storage devices 116, 118, and 120 that are part of a storage platform 114. Although three data storage devices 116, 118, and 120 are shown in FIG. 1, the execution platform 112 is capable of communicating with any number of data storage devices. In some embodiments, data storage devices 116, 118, and 120 are cloud-based storage devices located in one or more geographic locations. For example, data storage devices 116, 118, and 120 may be part of a public cloud infrastructure or a private cloud infrastructure, or any other manner of distributed storage system. Data storage devices 116, 118, and 120 may include hard disk drives (HDDs), solid state drives (SSDs), storage clusters, or any other data storage technology. Additionally, the storage platform 114 may include a distributed file system (such as Hadoop Distributed File Systems (HDFS)), object storage systems, and the like.

In some embodiments, the communication links between database service manager 102 and users 104-108, mutable storage 110 for information about metadata files (i.e., metadata file metadata), and execution platform 112 are implemented via one or more data communication networks and may be assigned various tasks such that user requests can be optimized. Similarly, the communication links between execution platform 112 and data storage devices 116-120 in storage platform 114 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

The database service manager 102, mutable storage 110, execution platform 112, and storage platform 114 are shown in FIG. 1 as individual components. However, each of database service manager 102, mutable storage 110, execution platform 112, and storage platform 114 may be implemented as a distributed system (e.g., distributed across multiple systems/platforms at multiple geographic locations) or may be combined into one or more systems. Additionally, each of the database service manager 102, mutable storage 110, the execution platform 112, and the storage platform 114 may be scaled up or down (independently of one another) depending on changes to the requests received from users 104-108 and the changing needs of the data processing platform 100. Thus, in the described embodiments, the data processing platform 100 is dynamic and supports regular changes to meet the current data processing needs.

Figure 2:
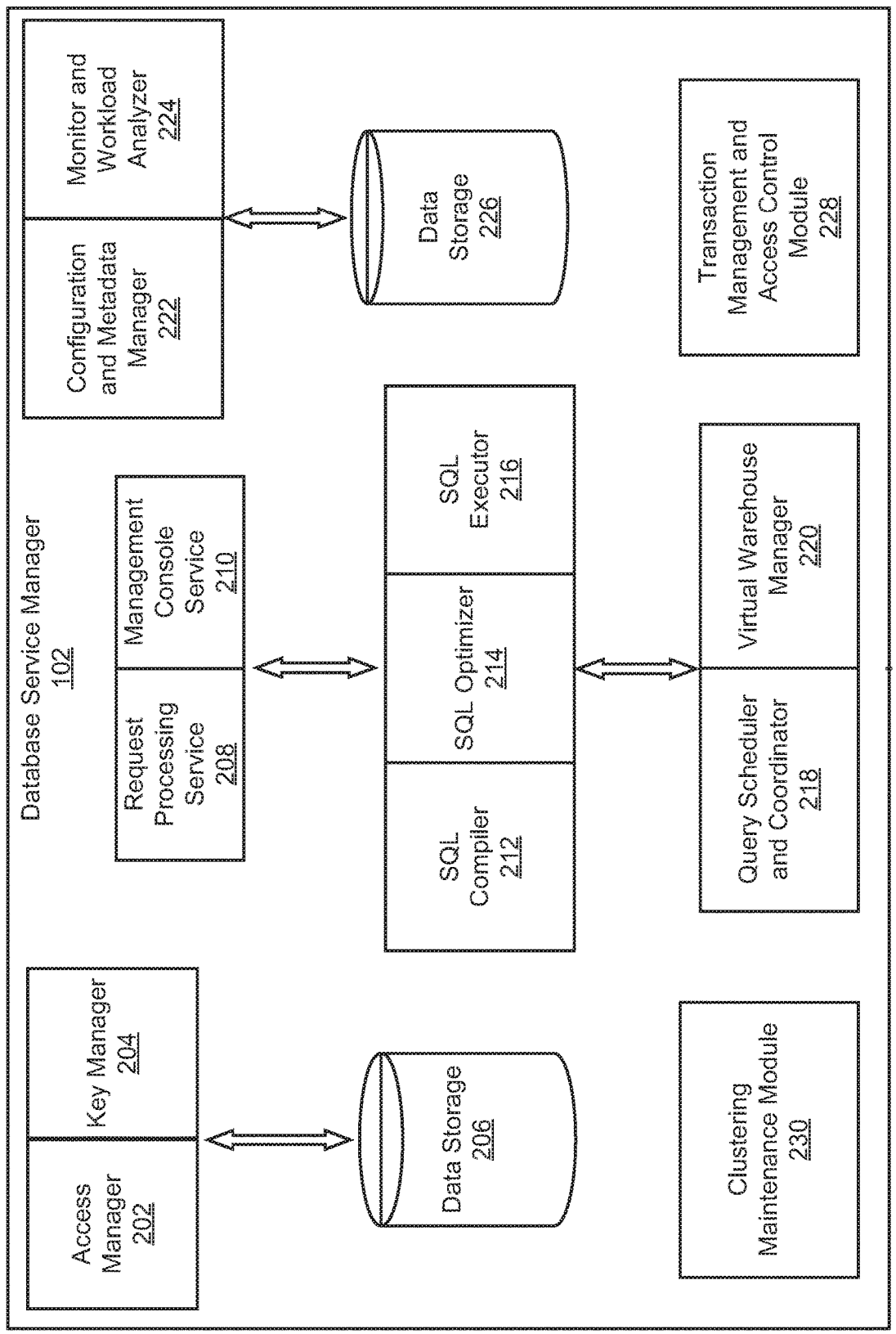
FIG. 2 is a block diagram illustrating components of a database service manager, according to one embodiment.

FIG. 2 illustrates a block diagram depicting components of database service manager 102, according to one embodiment. The database service manager 102 includes an access manager 202 and a key manager 204 coupled to a data storage device 206. The access manager 202 handles authentication and authorization tasks for the systems described herein. The key manager 204 manages storage and authentication of keys used during authentication and authorization tasks. A request processing service 208 manages received data storage requests and data retrieval requests. A management console service 210 supports access to various systems and processes by administrators and other system managers.

The database service manager 102 also includes an SQL compiler 212, an SQL optimizer 214 and an SQL executor 216. SQL compiler 212 parses SQL queries and generates the execution code for the queries. SQL optimizer 214 determines the best method to execute queries based on the data that needs to be processed. SQL executor 216 executes the query code for queries received by database service manager 102. For example, the SQL optimizer may prune out rows or partitions of a table that do not need to be processed in the query because it is known, based on metadata, that they do not satisfy a predicate of the query. A query scheduler and coordinator 218 sends received queries to the appropriate services or systems for compilation, optimization, and dispatch to an execution platform 212. A virtual warehouse manager 220 manages the operation of multiple virtual warehouses.

Additionally, the database service manager 102 includes a configuration and metadata manager 222, which manages the information related to the data stored in the remote data storage devices and in the local caches. A monitor and workload analyzer 224 oversees the processes performed by the database service manager 102 and manages the distribution of tasks (e.g., workload) across the virtual warehouses and execution nodes in the execution platform 112. Configuration and metadata manager 222 and monitor and workload analyzer 224 are coupled to a data storage device 226.

The database service manager 102 also includes a transaction management and access control module 228, which manages the various tasks and other activities associated with the processing of data storage requests and data access requests. For example, the transaction management and access control module 228 provides consistent and synchronized access to data by multiple users or systems. Since multiple users/systems may access the same data simultaneously, changes to the data may be synchronized to ensure that each user/system is working with the current version of the data. Transaction management and access control module 228 provides control of various data processing activities at a single, centralized location in database service manager 102.

The database service manager 102 includes a clustering maintenance module 230 that manages the clustering and ordering of partitions of a table. The clustering maintenance module 230 may partition each table in a database into one or more partitions or micro-partitions. The clustering maintenance module 230 may not require or achieve ideal clustering for the table data, but may maintain "good enough" or approximate clustering. For example, ideal clustering on a specific attribute may result in each partition either having non-overlapping value ranges or having only a single value for the specific attribute. Because the clustering maintenance module 230 does not require perfect clustering, significant processing and memory resources may be conserved during data loading or DML command operations.

In at least one embodiment, the clustering maintenance module 230 incrementally maintains the clustering of a clustered table as part of any DML operation. Because maintaining strict clustering can be prohibitively expensive, embodiments may not require complete table clustering. For example, the clustering maintenance module 230 may automatically pick partitions of the table that are the least clustered and re-organize those partitions only. If a user specifies clustering keys for a table, all new or modified records are automatically and incrementally maintained in the clustered table according to the clustering keys. Because clustering maintenance is performed incrementally, these incremental maintenance procedures may continue to improve or maintain clustering, moving toward an ideal clustered state, even if that state is never reached.

In case the automatic clustering maintenance fails to maintain a sufficient or desired level of clustering of a table, the clustering maintenance module 230 may recluster a table in response to an explicit RECLUSTER clause or command. For example, the RECLUSTER clause may be provided for an ALTER TABLE command. The ALTER TABLE . . . RECLUSTER command applies manual incremental reclustering of a table. The command may organize the records for a table based on any clustering keys, so that related records are relocated to the same partition. This DML operation may delete all records to be moved and re-inserts them grouped on the clustering keys. This operation may lock the table for the duration of the operation.

In at least one embodiment, pruning relies on a good clustering of the table that is scanned, but can still achieve good performance even if clustering is not perfect. At least one embodiment relies on the natural clustering that arises from trickle loading of the table over time. Any implied clustering or correlation to this clustering is used by the compiler to prune out irrelevant files.

Clustering may also be performed based on explicit cluster attributes or keys specified by a user. For example, the user may specify one or more column attributes as clustering keys. Those clustering attributes are used by the system to automatically maintain clustering of both existing and new partitions. Embodiments may extend the create table statement with a cluster by clause for example: CREATE TABLE emp (empno number, mgr number, hire_date date, salary number) CLUSTER by (mgr, hire_date); or CREATE TABLE<table_name> ([<column_name><column_type>]+) CLUSTER BY (expression+) Internally, the input query into the load will be sorting the new rows on the clustering keys.

To maintain some clustering on load, insert and copy statement implementations may also be modified to cluster the incoming rows on the clustering keys. A sort operation may be introduced or inserted just before an INSERT operation. The modification of the DML operations does not guarantee a perfect global clustering of the rows because, in one embodiment, only the incoming batches of new rows are maintained. A perfect clustering of a table on those attributes can be achieved by re-creating the table using an ORDER BY on the clustering key. This may be too costly to create and/or too expensive to maintain as new partitions are added to a potentially extremely large table. As an alternative, to manually trigger a re-clustering of a subset of the table, a new ALTER TABLE variant is introduced with an open-ended syntax: ALTER TABLE<table_name>RECLUSTER<clustering_options>, where clustering_options could be method, maximum_size, or other parameter. An example statement could be: ALTER TABLE<table_name>RECLUSTER using method=last_files, maximum_size=10 GB. This command would recluster a maximum of 10 GB of the table table_name using the current heuristic method 'last_files'. Additional heuristics are discussed in the Incremental Clustering Heuristics section below.

At least some embodiments may manage the ordering or clustering of a table using micro-partitions. As mentioned previously, traditional data warehouses rely on static partitioning of large tables to achieve acceptable performance and enable better scaling. In these systems, a partition is a unit of management that is manipulated independently using specialized data definition language (DDL) and syntax. However, static partitioning has a number of well-known limitations, such as maintenance overhead and data skew, which can result in disproportionately-sized partitions. Embodiments disclosed herein may implement a powerful and unique form of partitioning, called micro-partitioning, that delivers all the advantages of static partitioning without the known limitations, as well as providing additional significant benefits.

In one embodiment, all data in tables is automatically divided into micro-partitions, which are contiguous units of storage. By way of example, each micro-partition may contain between 50 MB and 500 MB of uncompressed data (note that the actual size in storage may be smaller because data may be stored compressed). Groups of rows in tables are mapped into individual micro-partitions, organized in a columnar fashion. This size and structure allows for extremely granular pruning of very large tables, which can be comprised of millions, or even hundreds of millions, of micro-partitions. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

Micro-partitioning may provide many benefits. In contrast to traditional static partitioning, micro-partitions may be derived automatically; that is, they do not necessarily need to be explicitly defined up-front or maintained by users. As the name suggests, micro-partitions may be small in size (e.g., 50 to 500 MB, before compression), which enables extremely efficient DML and fine-grained pruning for faster queries. Micro-partitions are allowed to overlap in their range of contained values, which, combined with their uniformly small size, helps prevent skew. In one embodiment, columns are stored independently within micro-partitions (i.e. columnar storage) to enable efficient scanning of individual columns; only the columns referenced by a query are scanned. In one embodiment, columns are also compressed individually within micro-partitions. The database service manager 102 may automatically determine the most efficient compression algorithm for the columns in each micro-partition.

In one embodiment, all DML operations (e.g. DELETE, UPDATE, MERGE) are designed to take advantage of the underlying micro-partition metadata to facilitate and simplify table maintenance. For example, some operations, such as deleting all rows from a table, are metadata-only operations. The micro-partition metadata maintained by the configuration and metadata manager 222 enables precise pruning of columns in micro-partitions at query run-time, including columns containing semi-structured data. In other words, a query that specifies a filter predicate on a range of values that accesses 10% of the values in the range should ideally only scan about 10% of the micro-partitions. For example, assume a large table contains one year of historical data with date and hour columns. Assuming uniform distribution of the data, a query targeting a particular hour would ideally scan 1/8760 of the micro-partitions comprising the table and then only scan the portion of the micro-partitions that contain the data for the hour column. The system may use columnar scanning of partitions so that an entire partition is not scanned if a query only filters by one column. In other words, the closer the ratio of scanned micro-partitions and columnar data is to the ratio of actual data selected, the more efficient is the pruning performed on the table. For time-series data, this level of pruning enables potentially sub-second response times for queries within ranges (i.e. "slices") as fine-grained as one hour or even less.

Often, data stored in tables in data warehouses is sorted/ordered along natural dimensions (e.g. date and/or geographic regions). In one embodiment, the clustering maintenance module 230 may default to natural clustering if no explicit clustering keys are specified. Clustering may be a key factor in query performance because table data that is not sorted or is only partially sorted may impact query performance, particularly on very large tables.

In one embodiment, the clustering maintenance module 230 automatically sorts data as it is inserted/loaded into a table. Data with the same key values is co-located, as much as possible and within a budget, in the same micro-partition. The configuration and metadata manager 222 then leverages the information it transparently maintains for each table to avoid scanning micro-partitions during queries, significantly accelerating the performance of queries that reference these columns.

Figure 4:
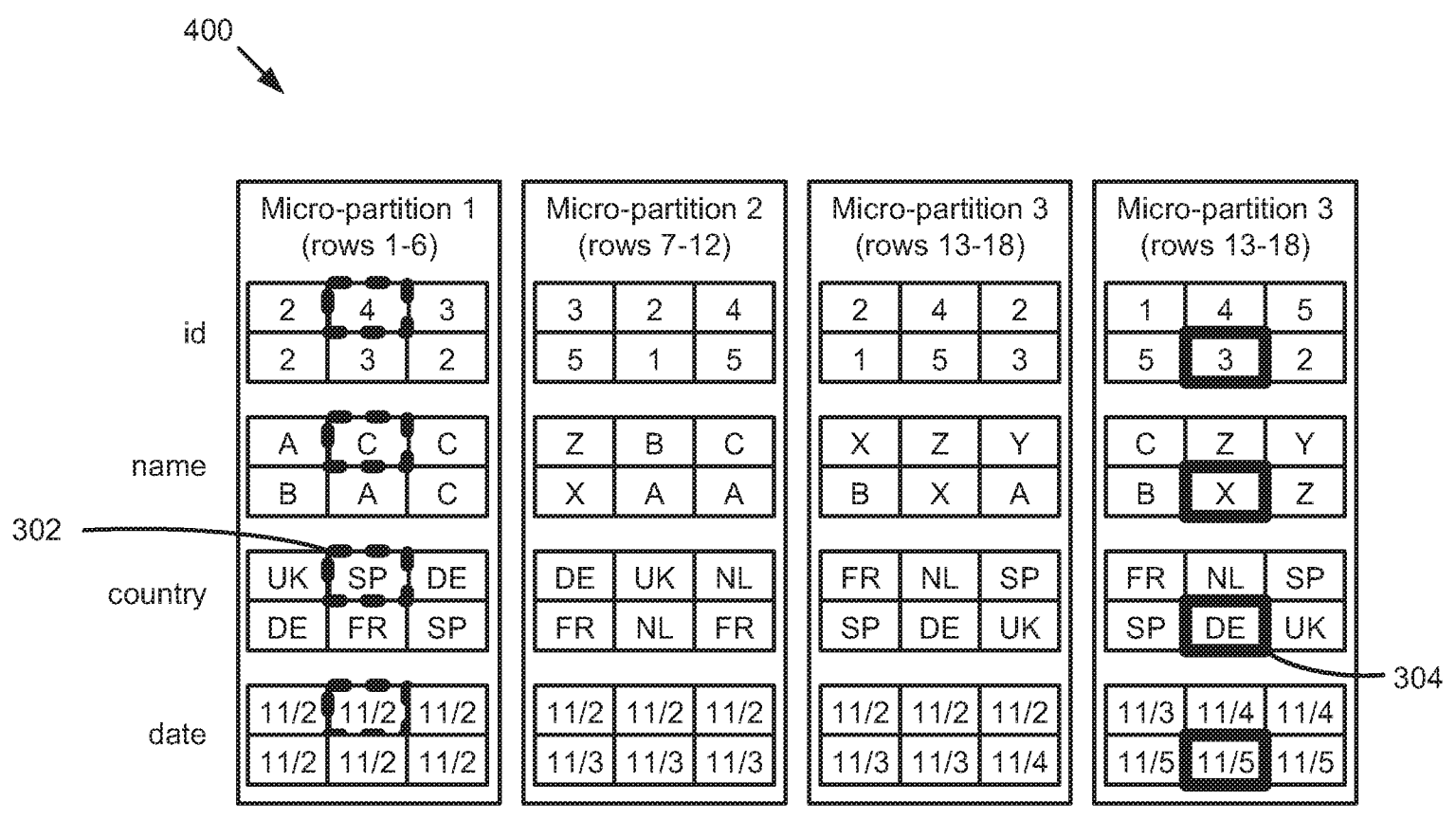

FIG. 3 is a schematic diagram illustrating the logical structure 300 of a table 300. The table is named 't1' which will be seen in example queries or DML statements. FIG. 4 illustrates a physical structure 400 of the table 300, according to one embodiment. The table 300 has 4 columns naturally sorted (e.g., as received/added). The table 300 includes 24 rows. The table data of table 300 is stored across 4 micro-partitions, shown in the physical structure 400, with the rows divided equally between each micro-partition. Row 2 is shown with bolded dash lines 302 and row 23 is shown with bolded solid lines 304 in both the logical structure shown in FIG. 3 and physical structure shown in FIG. 4 to illustrate how they relate.

Within each micro-partition, the data is sorted and stored by the date column, which enables the system to perform the following actions for queries on the table: prune micro-partitions that are not needed for the query; and prune by column within the remaining micro-partitions. Even though partitions are sorted by column, the partitions are not necessarily sorted relative to each other and there is some overlap between partitions. E.g., micro-partitions 1, 2, and 3 all include an November 2 date. Note that this diagram is intended only as a small-scale conceptual representation of the natural data clustering that may be utilized for micro-partitions for any size table, including very large tables.

The configuration and metadata manager 222 maintains clustering metadata for the micro-partitions in a table. The metadata may include one or more of: the total number of micro-partitions for a table; the number of micro-partitions containing values that overlap with each other (in a specified subset of table columns); and/or the depth of the overlapping micro-partitions. In one embodiment, these details may be accessed using the following system functions: SYSTEM$CLUSTERING_DEPTH, SYSTEM$CLUSTERING_INFORMATION, SYSTEM$CLUSTERING_RATIO.

The clustering ratio may be computed based on overlaps of partitions with each other, the average number of partitions that overlap for each value in a column, or other parameters. In one embodiment, the clustering ratio for a table is a number between 0 and 100 that indicates whether the clustering state of the table has improved or deteriorated due to changes to the data in the table. The higher the ratio, the more optimally clustered the table is, with a value of 100 indicating that the table is fully clustered. Clustering ratios can be used for a variety of purposes, including: monitoring the clustering "health" of a large table, particularly over time as DML is performed on the table; and/or determining whether a large table would benefit from explicitly-defined clustering keys.

In one embodiment, computing a clustering ratio may be performed by computing the entropy of all overlapping files, and use that to compute the clustering ratio. For each point query, each additional file introduces an entropy of $1/depth*log(depth)$. Summing up all the entropy introduced by all overlapping files yields to $log(depth)$ for each file. So for constant files, whose depth is one, it will introduce an additional entropy of $log(1)=0$. Assuming uniform range distribution, the total entropy is $(1/numFiles)*sum(log (depth)). This may be used as the ratio of non-clustered data for the table. Non-overlapping files may be treated as a separate class in the computation—their clustering property cannot be improved further, and they introduce no additional entropy. The current state of the table may be compared with the worst state, which assumes that all overlapping files are in one cluster, so with n overlapping files with a total depth of d, the worst-case entropy will be n*log (d/n). This is the product of the square root of the total depth, so it's guaranteed to be always bigger than any other arrangement of entropies which sum to the same total depth. To sum up, assuming the number of constant files is c, and the overlapping files are numbered $1, \ldots n$, and their depths are d1, d2, ... dn respectively, the clustering ratio is computed as shown in Equation 1:

$$1 - (\log d1 + \log d2 + \ldots + \log dn)/\left(c + n\log\frac{d1 + d2 + \ldots + dn}{n}\right) \quad \text{Equation 1}$$

Equation 1 is guaranteed to provide a range of [0, 1] for the clustering ratio. This value can be multiplied by a number to obtain a desired scale (e.g., multiple 100 to get the scale from 0-100).

Note that, in some embodiments, clustering ratios of 100 are theoretically possible, but are not required to achieve optimal query performance. A table that consists of a single micro-partition or no micro-partitions (i.e. an empty table) always has a clustering ratio of 100. In one embodiment, the minimum value for a clustering ratio is 0 and any negative ratios are rounded to 0. A negative ratio may occur if the number of overlapping micro-partitions are high relative to the total number of micro-partitions for the table.

The clustering ratio for a table may not be an absolute or precise measure of whether the table is well-clustered. It may be a relative value intended as a guideline for optimizing data storage within a specific table. Clustering ratios may not be useful as comparisons between tables because every table and data clustering scenario is different depending on the data characteristics of the table. In other words, if a table has a higher ratio than another table, it does not necessarily indicate that the first table is better clustered than the second table. Ultimately, query performance is often the best indicator of how well-clustered a table is. If queries on a table are performing as needed or expected, the table is likely well-clustered and subsequent reclustering may not dramatically change the ratio or improve performance. If query performance degrades over time and there is a corresponding lowering in the clustering ratio for the table, the table is likely no longer optimally clustered and would benefit from reclustering.

Figure 5:
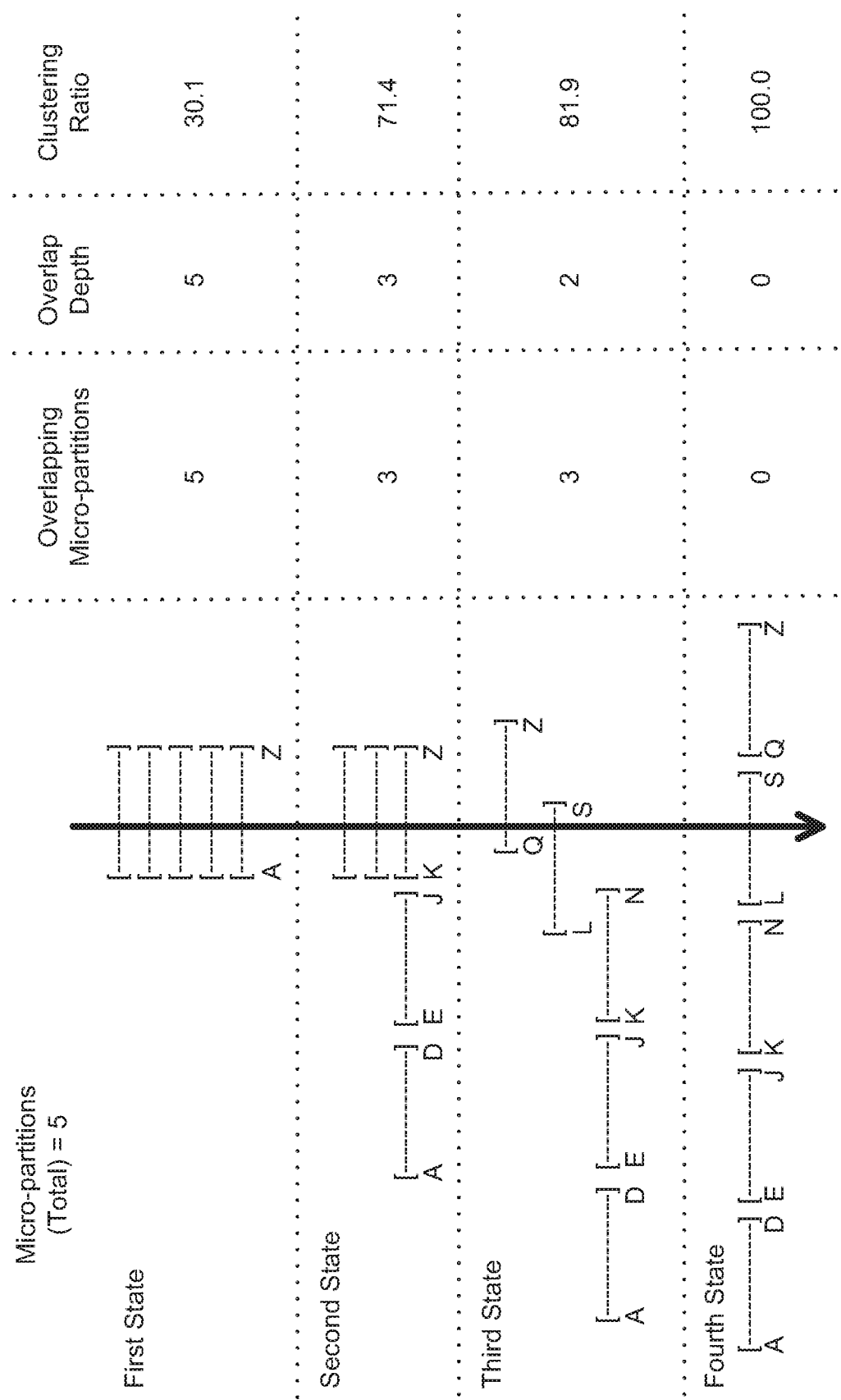
FIG. 5 is schematic diagram illustrating a simplified view of how overlap affects clustering ratio for a table, according to one embodiment.

FIG. 5 is a schematic diagram illustrating a simplified view of how the degree of overlapping between partitions affects clustering ratio. Overlap for a table consisting of 5 micro-partitions is illustrated at various stages with corresponding statistics for the number of overlapping micro-partitions, overlap depth, and clustering ratio. The table is clustered on a column comprising values ranging from A to Z. In a first state, the range of values in all the micro-partitions overlap and the clustering ratio is low (30.1). As the number of overlapping micro-partitions decreases and the overlap depth decreases in the second state and third state, the clustering ratio improves (71.4 and 81.9). When there is no overlap in the range of values across all micro-partitions, the micro-partitions are considered to be in a constant state (i.e. they cannot be improved by reclustering) and table has a clustering ratio of 100. In this fourth state, the table is considered to be fully clustered.

In one embodiment, incremental clustering performed by the clustering maintenance module 230 may perform processes that result in incremental improvement in clustering, such as from the first step to the second step, etc. Thus, incremental improvement in clustering may be achieved, or a desired level of clustering may be maintained even when other changes (such as other DMLs) are constantly performed on the table.

In many cases, natural clustering produces well-clustered data in tables; however, over time, particularly as DML occurs, the data in some table rows may not naturally cluster on desired dimensions. To improve the natural clustering of the underlying micro-partitions, a user may wish to sort rows on important columns and re-insert them into the table. However, for very large tables (as defined by the size of the data in the table, not the number of rows), this manual operation might be expensive and cumbersome. At least one embodiment here allows a user to specify clustering keys for one or more columns/expressions on the table.

Although clustering keys may make filtering more efficient, not all tables necessarily benefit from clustering keys. To see performance improvements from clustering keys, a table has to be large enough to reside on more than one micro-partition, and the clustering keys have to provide sufficient filtering to select a subset of these micro-partitions. In some embodiments, tables in the multi-terabyte (TB) size range will see the most benefit from clustering keys, particularly if the table experiences a significant amount of DML commands.

In one embodiment, clustering keys are a subset of columns or expressions on a table that are explicitly designated for co-locating the data in the same micro-partitions. Clustering keys can be defined when creating a table (using the CREATE TABLE command) or afterward (using the ALTER TABLE command). Clustering keys can also be altered or dropped at any time. Some general indicators that can help determine whether it would be helpful to define clustering keys for a very large table include: queries on the table are running slower than expected or have noticeably degraded over time; and/or the clustering ratio for the table is very low and the clustering depth is very high. In at least one embodiment, if a user defines clustering keys for an existing table (or modifies the existing clustering keys for a table), the rows in the table are not reorganized until the table is reclustered using the ALTER TABLE command. Using clustering keys to cluster data in large tables may offer several benefits, including: co-locating similar rows in the same micro-partitions improves scan efficiency in queries by skipping large amount of data that does not match filtering predicates; co-locating similar rows in the same micro-partitions usually enables better column compression than in tables with no clustering keys, this may especially be true when other columns are strongly correlated with the clustering keys; and/or once defined, clustering keys require little or no maintenance.

Selecting the right clustering key(s) can dramatically impact query performance. Analysis of a workload will usually yield some ideal clustering key candidates. For example, if queries are typically filtered on one column, such as a date column, that column may be a good candidate as the clustering key for the table. Similarly, queries are typically run on a table by two dimensions, such as application_id and user_id columns, clustering on those columns can help to improve the query performance for the table. In at least some embodiments, the number of distinct values (i.e. cardinality) in a clustering key is a critical aspect of selecting a clustering key. It may be important to choose a clustering key that has a large enough number of distinct values to enable effective pruning on the table and a small enough number of distinct values to allow the systems to effectively group rows in the same micro-partitions. A very low cardinality column (e.g. a column containing gender values) would only yield minimal pruning. In contrast, a very high cardinality column (e.g. a column containing timestamp or UUID values) can be expensive to maintain clustering for. As a general rule, it may be recommended to order the keys from lowest cardinality to highest cardinality. If a column has very large cardinality, it is often not a good candidate to use as a clustering key directly. For example, a fact table might have a timestamp column c_timestamp containing many discrete values (many more than the number of micro-partitions in the table). The column may still be used as a clustering key, but with the clustering key being a defined expression on the column, which reduces the number of distinct values. For example, a clustering key could be defined on the c_timestamp column by casting the values to dates instead of timestamps (e.g. to_date(c_timestamp)). This would reduce the cardinality to the total number of days, which is much better for pruning.

In one embodiment, the clustering maintenance module 230 supports using the ALTER TABLE command with a RECLUSTER clause to manually recluster a table with clustering keys at any time. The command organizes the records for the table based on the clustering keys, so that related records are relocated to the same micro-partition. This DML operation deletes all records to be moved and re-inserts them, grouped on the clustering keys. As with any DML operation, this operation may lock the table for the duration of the operation. There is also a storage cost for reclustering. Each time data is reclustered, the rows are physically grouped based on the clustering keys, which results in the system generating new micro-partitions for the data. Adding even a small number of rows to a table can cause all micro-partitions that contain those values to be recreated.

Figure 6:
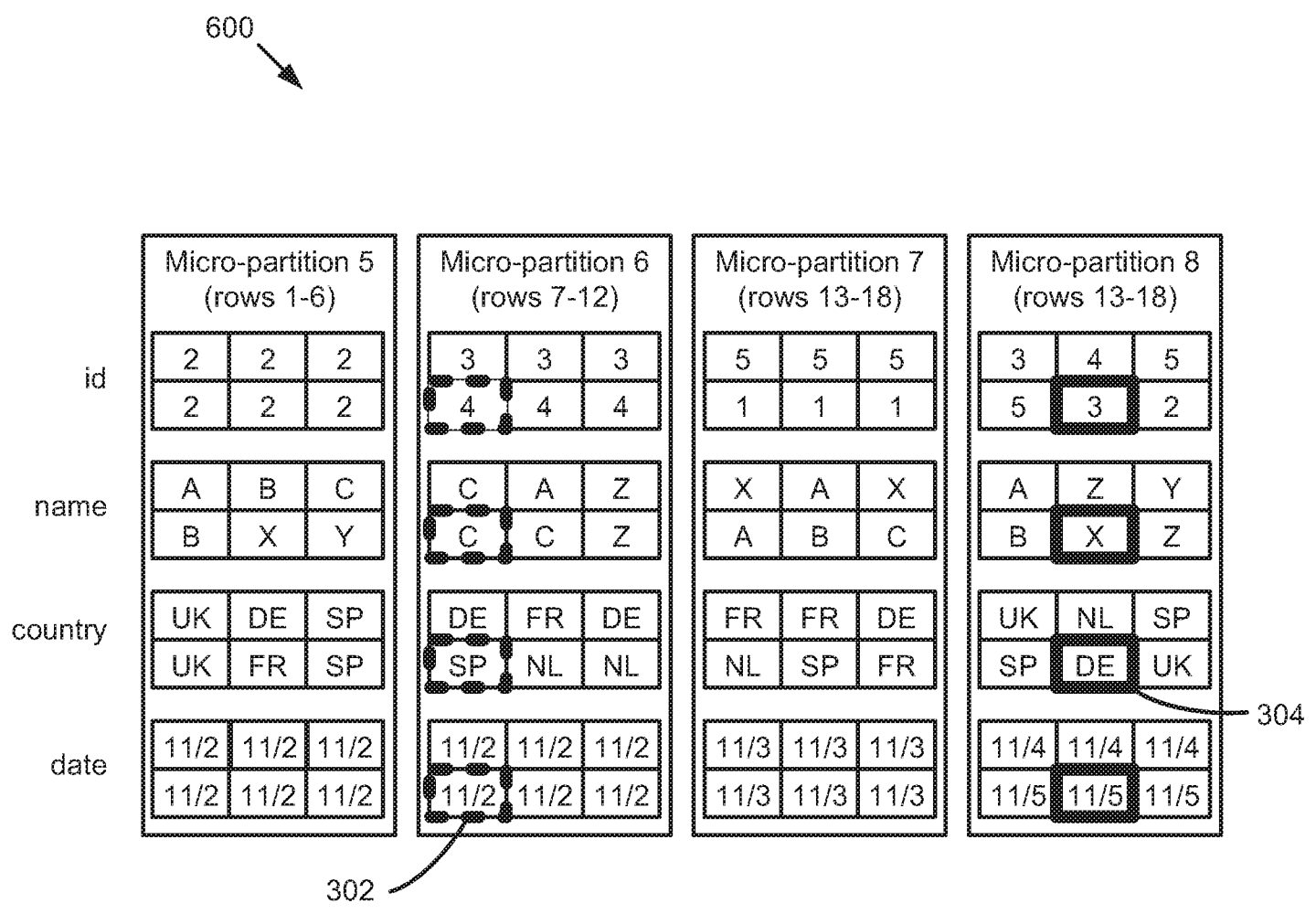

FIG. 6 is a schematic diagram illustrating a physical structure 600 for reclustered partitions in relation to the physical structure 400 (FIG. 4) of table 300 (FIG. 3). The reclustered physical structure 600 illustrates how reclustering a table can help reduce scanning of micro-partitions to improve query performance with respect to the following example query: SELECT name, country FROM t WHERE id=2 AND date='11/2'. As previously discussed the table 300 as partitioned in FIG. 4, is naturally clustered by date across micro-partitions 1-4. In the clustered state of FIG. 4, the example query above requires scanning micro-partitions 1, 2, and 3. The date and id columns may be defined as clustering keys using the following statement "ALTER TABLE t1 CLUSTER BY (date, id);". The table 300 is then reclustered using the statement "ALTER TABLE t1 RECLUSTER;". Upon reclustering, the system creates new micro-partitions 5 through 8, as illustrated in FIG. 6. After clustering, the above query needs to scan only micro-partitions 5 and 6. Row 2 is shown with a new relative position indicated by bolded dash lines 302 and row 23 is shown in a same relative position by bolded solid lines 304.

In addition, after reclustering micro-partition 5 has reached a constant state (i.e. it cannot be improved by reclustering) and is therefore excluded from being considered as a candidate of reclustering for future maintenance. In a well-clustered large table, most micro-partitions will fall into this category. In one embodiment, the original micro-partitions (1-4 of FIG. 4) may be marked as deleted, but not purged from the system. For example, the may be retained for recovery or version control. This example illustrates the impact of reclustering on an extremely small scale. For a large table (i.e. consisting of millions of micro-partitions), reclustering can have a significant impact on scanning and, therefore, query performance.

In one embodiment, explicit reclustering or automatic reclustering (e.g., triggered by a degradation in the degree of clustering of a table) may be provided with a budget or limitation on the resources the reclustering process can use. For example, a user may input an ALTER TABLE command with a RECLUSTER clause to manually recluster a table for which clustering keys have been defined using the following command: ALTER TABLE<name>RECLUSTER [MAX_SIZE=<budget_in_bytes>] [WHERE<condition>]. The MAX_SIZE=budget_in_bytes and is used to specify the upper-limit on the amount of data (in bytes) in the table to recluster. Reclustering may stop before the limit is reached if there are no more micro-partitions to recluster or that can be reclustered without exceeding the budget. If MAX_SIZE is not specified, the system may automatically select a size based on the resources available in the virtual warehouse used for the reclustering. For example, the command "ALTER TABLE t1 RECLUSTER;" automatically picks the best budget to use to recluster the table based on the resources available in the system that this command is run on. The larger the warehouse, the more budget will be given to the recluster command, the more effective the recluster will be. The WHERE condition specifies a condition or range on which to recluster data in the table. In one embodiment, reclustering can only be performed on tables that have clustering keys defined. The reclustering keys may include explicitly defined or automatically selected columns or keys (for example, the system may automatically select a date, location, and/or id column based on how data is loaded or on the most common query types).

Figure 7:
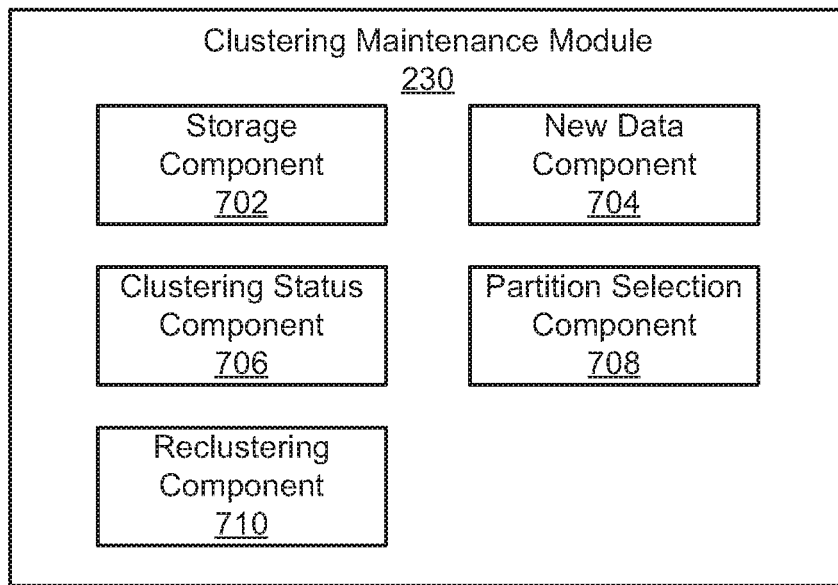
FIG. 7 is a schematic block diagram illustrating components of a clustering maintenance module, according to one embodiment.

FIG. 7 is a schematic block diagram illustrating components of a clustering maintenance module 230, according to one embodiment. The clustering maintenance module 230 may include code, circuitry, or the like to implement methods and algorithms to maintain at least approximate clustering of table to maintain performance. The clustering maintenance module 230 includes a storage component 702, a new data component 704, a clustering status component 706, a partition selection component 708, and a reclustering component 710. The components 702-710 are given by way of example only and may not all be included in all embodiments. For example, each of the components 702-710 may be included in or may be implemented as part of a separate device or system.

The storage component 702 is configured to store and/or manage storing of clustering of table data within a plurality of partitions. For example, one portion of table data of a table may be included in a first partition while another portion of the data of the table is included in a second partition. The partitions or clusters may be located on the same or different storage devices. Data on different storage devices may be accessed simultaneously so that queries relating to different portions of data may be serviced at the same time without waiting for the other to finish.

In one embodiment, the database or table data may be partitioned or clustered based on one or more of a natural division for the underlying data and/or an indication or rule from a user, such as an administrator, controlling program, or the like. For example, Internet-of-things (IoT) data may come in at periodic intervals such as on an hourly, daily, weekly, or any other interval. The periodic interval for data collection may provide a natural division for the data such that data for a specific day or interval may be included within the same partition. Other types of natural divisions include data type, data location (e.g., state, zip code, city, country, or the like), customer corresponding to the data, or any other metadata or information about the data. The storage component 702 may also cause a database server manager 402 to store metadata for each partition wherein the metadata comprises min and max of row values corresponding to the one or more attributes.

In one embodiment, the natural divisions may be automatically selected based on system limitations or administrator specifications. For example, if a system or administrator indicates a maximum partition size, the clustering maintenance module 230 may automatically determine how to partition that data. As a further illustration, a user may specify that data in a database or table is to be clustered based on a specific metric or metadata (e.g., date, location, customer) then the system divides up data in such a way that it meets requirements of a user or system (e.g., maximum partition size). For example, the data may be divided up into partitions or clusters such that no partition or cluster is larger than the maximum partition size.

The new data component 704 is configured to receive new data for storage in a database or table. The new data may include data corresponding to the type of data or information to be stored by the database or table. For example, the database or table may be used for storage of IoT data from sensors or smart devices. The new data may include data from these sensors or smart devices.

In one embodiment, the new data component 704 creates intermediary partitions for the incoming new data. The intermediary partitions may be created using the same rules as the partition for the data stored by the storage component 702. For example, if the database or table is partitioned or clustered based on date and a maximum partition size, the new data component 704 may create one or more intermediate partitions out of the new data. The intermediate partitions may then be merged or reclustered to create new partitions or to be combined with existing partitions.

In one embodiment, changes to the table may be grouped together into new partitions. For example, one or more new partitions may be created that include data added during based on one or more DML operations on the table. These changes, with the new partitions, may overlap either with another new partition or with previous partitions already existing in the table. These overlaps may result in a decrease in a degree of clustering of the table. The degree of clustering of the table may be based at least in part on, for example, a clustering ratio. The changes to the table may be based on one or more of a DML command or a trickle or bulk loading of table data.

The clustering status component 706 is configured to determine how well clustered is the partitioned table data for a specific table. For example, systems, methods, and embodiments disclosed herein present the idea that a table or database is "clustered enough." Specifically, many of the benefits of partitioning/clustering can be obtained by having well clustered, if not perfectly clustered, partitions for a table. However, over-time, the quality of clustering will degrade and those benefits may be lost.

In one embodiment, the clustering status component 706 may determine how well partitioned the database or table is based on a clustering ratio or other metric for clustering or partitioning quality. Example algorithms for determining whether the current status of the database meets the clustering or partitioning quality include a width-depth algorithm, a width plus number of overlapping files (partitions) algorithm, or any other algorithm or metric for clustering or partitioning quality. See algorithms for incremental clustering heuristics in the Incremental Clustering Heuristics section below. In one embodiment, the clustering ratio or other metric may be exposed for viewing and modification by a user or program. Thus, a user or program may specify how well clustered/partitioned the table or database should be.

In one embodiment, the clustering status component 706 determine that a degree of clustering of the table data is below a clustering threshold. The clustering threshold may include a value for an attribute of the table that can be calculated or measured. For example, the clustering threshold may be based on a clustering ratio for the table. The clustering status component 706 may determine the degree of clustering (for example, a clustering threshold) based on one or more of: how many partitions overlap other partitions of the table; a degree of overlap of one or more partitions with other partitions of the table; determining how many partitions overlap for one or more attribute values; or determining an average depth of the table partitions, wherein the depth comprises a number of partitions that overlap for a specific attribute value for the one or more attributes. The clustering status component 706 may also determine a degree of clustering based on an example query and a threshold time for how long the query should take (e.g., a commonly executed query or a query specified by an administrator as a test for clustering). The clustering status component 706 may determine that an execution time of the example query exceeds a threshold query execution length. In one embodiment, the clustering status component 706 may periodically or intermittently, when resources are available, determine whether the degree of clustering of the table data is below the clustering threshold as part of a background process.

The partition selection component 708 is configured to select two or more partitions as merge candidates to be merged into two or more new partitions. The partition selection component 708 may select the merge candidates in response to the clustering status component 706 determining that the table clustering has degenerated below a threshold, in response to an explicit user command from a user, and/or as part of a DML command. The merge may be performed as part of an incremental reclustering process to improve or maintain a degree of clustering of the partitions for a table.

The partition selection component 708 may select the merge candidates based on various features. For example, the partition selection component 708 may only select partitions containing overlapping values for the one or more attributes. As another example, the partition selection component 708 selects partitions in which a degree to which the two or more partitions overlap is maximized (e.g., they have the largest overlap of any available partitions). The partition selection component 708 may prioritize or omit partitions based on the ranges or width of values covered. For example, partitions that cover a large key value range may be prioritized over partitions covering a smaller range. The partition selection component 708 may also select merge candidates based on a budget for the current reclustering or clustering maintenance procedure. For example, the budget may indicate a number of partitions that can be merged, an amount of memory that can be used, or an amount of processing resources that may be used. The partition selection component 708 may select the partitions based on this budget. Additionally, the partition selection component 708 may select more partitions for merging/reclustering if the budget is bigger and thus provide a greater improvement to clustering.

Partitions that are already ideally clustered may be omitted from consideration because merging/reclustering will not improve the clustering of an ideally clustered partition. For example, the partition selection component 708 may ignore partitions that do not overlap any other partitions in the table and/or do not overlap beyond an overlap threshold with any other partitions in the table. Similarly, the partition selection component 708 may ignore partitions where all values for the clustering key(s) have an identical value.

In one embodiment, the partition selection component 708 groups partitions based on similar partition width. The partition width may be the range of values or may be at least proportional to the range of values for the one or key attributes within rows in the partition. For example, the larger the difference between a min and max value for the rows in a partition, the greater the partition width. Similarly, partitions that have an identical value for all rows in a given column have a minimal partition width (e.g., partition width=0). In one embodiment, the partition selection component 708 groups partitions based on log base N of the partition width ($\log_N$ (partition width)). For example, if N=2, then the partitions may be grouped the following groups: 0>partition width>=2; 2>partition width>=4; 4>partition width>=8; 8>partition width>=16; 0>partition width>=32; and so forth. The logarithmic base N may be any value, as desired. After grouping, the partition selection component 708 may prioritize selection of partitions that belong to the same group and/or that belong to the same group with the greatest width.

The reclustering component 710 is configured to perform a reclustering procedure to recluster the partitions of a table. For example, the reclustering component 710 may perform a reclustering procedure on the two or more partitions selected by the partition selection component 708. The reclustering component 710 perform reclustering in response to the clustering status component 706 determining that the table clustering has degenerated below a threshold, in response to an explicit user command from a user, and/or as part of a DML command. The reclustering may be performed as part of an incremental reclustering process to improve or maintain a degree of clustering of the partitions for a table.

The reclustering component 710 may perform different types of reclustering based on a budget or the type of recluster. For example, if an unlimited budget or a full recluster is requested, the reclustering component 710 may utilize a separate virtual warehouse to create new partitions for a table in an ideal manner. On the other hand, if a low budget is available or the reclustering is to be performed as part of a DML command or incremental reclustering procedure, the reclustering component 710 may merge or recluster partitions two or more partitions at a time. The incremental clustering procedure may be designed to increase clustering (e.g., reduce overlap) so that the incremental clustering procedure will converge toward ideal clustering over time or over many iterations.

By way of example, incremental reclustering may select two or more partitions to be merged to create one or more new partitions. The resulting new partitions may be better clustered and thus improve the overall clustering of the table. After the selected two or more partitions are merged, two or more additional partitions may be merged to further improve clustering. Because incremental clustering may be used, and because ideal clustering is not required, the table may not be ideally clustered before or after the reclustering procedure, or even at any time during the existence of the table. For example, the table may not be ideally clustered because there may still be overlap between different partitions or partitions may include more than one value for a specified clustering key. However, the clustering may be maintained in a "good enough" state that pruning still allows for optimal or near optimal query responses. Thus, any inefficiencies that may result because ideal clustering is not achieved may be offset, in some cases significantly, by gained efficiencies in avoiding the overhead of creating or maintaining ideally clustered partitions.

Figure 8:
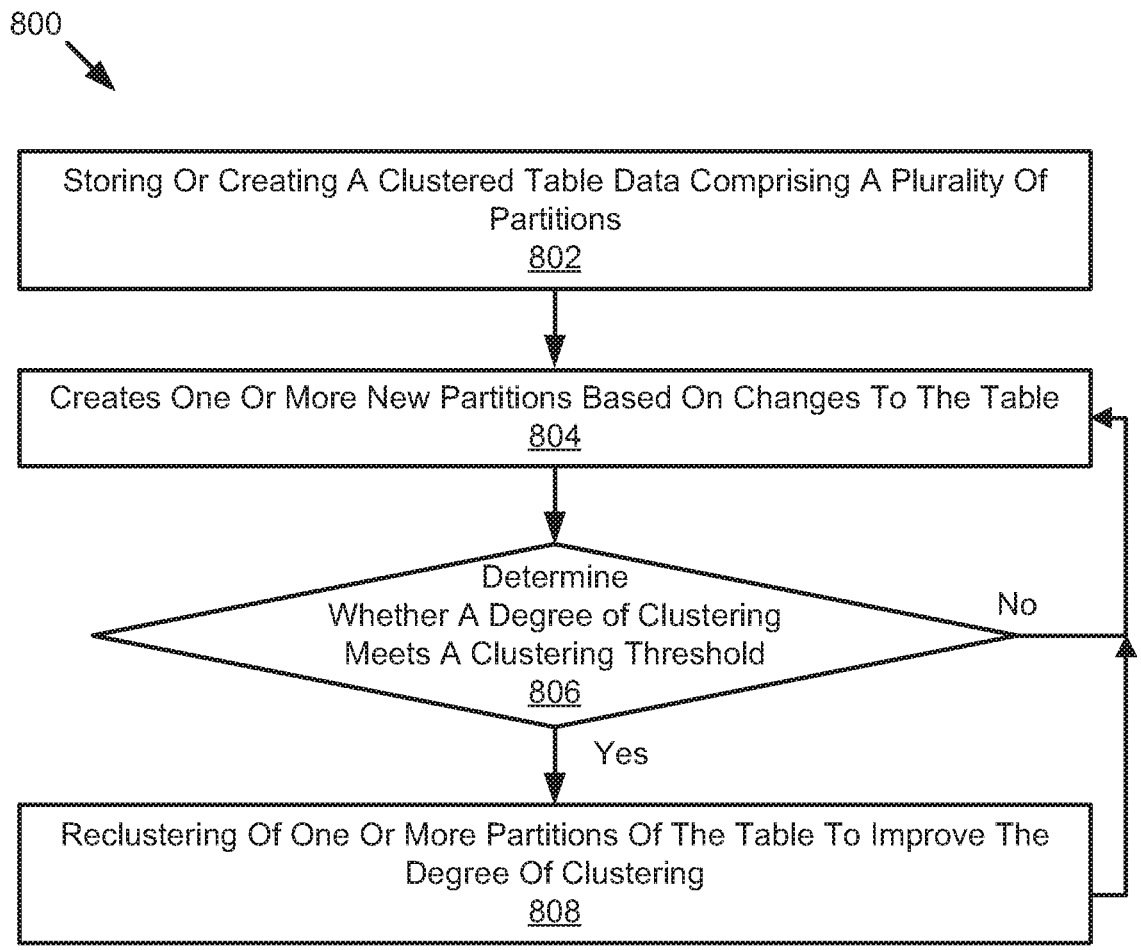
FIG. 8 is a schematic flow chart diagram illustrating a method for incremental clustering maintenance, according to one embodiment.

FIG. 8 is a schematic flow chart diagram illustrating an example method 800 for incremental clustering maintenance for a table. The method 800 may be performed by a database management system, the database service manager 102, and/or the clustering maintenance module 230.

The method 800 begins and a database management system 102 stores 802 table data for a table in a plurality of partitions. Each partition includes a portion of the table data for the table and the partitions are at least partially clustered based on one or more attributes in the table. The database service manager 102 creates 804 one or more new partitions based on changes to the table. The changes to the table may include DML commands that result in the addition of rows to or deletion of rows from the table. The at least one of the one or more new partitions overlap with each other or previous partitions resulting in a decrease in a degree of clustering of the table. In one embodiment, the database service manager 102 may perform merging/reclustering on the one or more new partitions with respect to each other.

The database service manager 102 determines 806 whether a degree of clustering of the table data is below a clustering threshold. If the database service manager 102 determines that the degree of clustering is below the clustering threshold (YES at 806) the database service manager 102 triggers a reclustering 808 of one or more partitions of the table to improve the degree of clustering of the table. The reclustering 808 may be an incremental reclustering where partitions are selected for merging/reclustering, as discussed above. For example, the reclustering 808 may not include a full reclustering that results in ideally clustered partitions for the table. If the database service manager 102 determines that the degree of clustering is not below the clustering threshold (YES at 806) the database service manager 102 may continue to create 804 one or more new partitions based on changes to the table. Thus, expense reclustering or incremental reclustering procedures may be avoided unless they are necessary/helpful to improve queries on the table.

Figure 9:
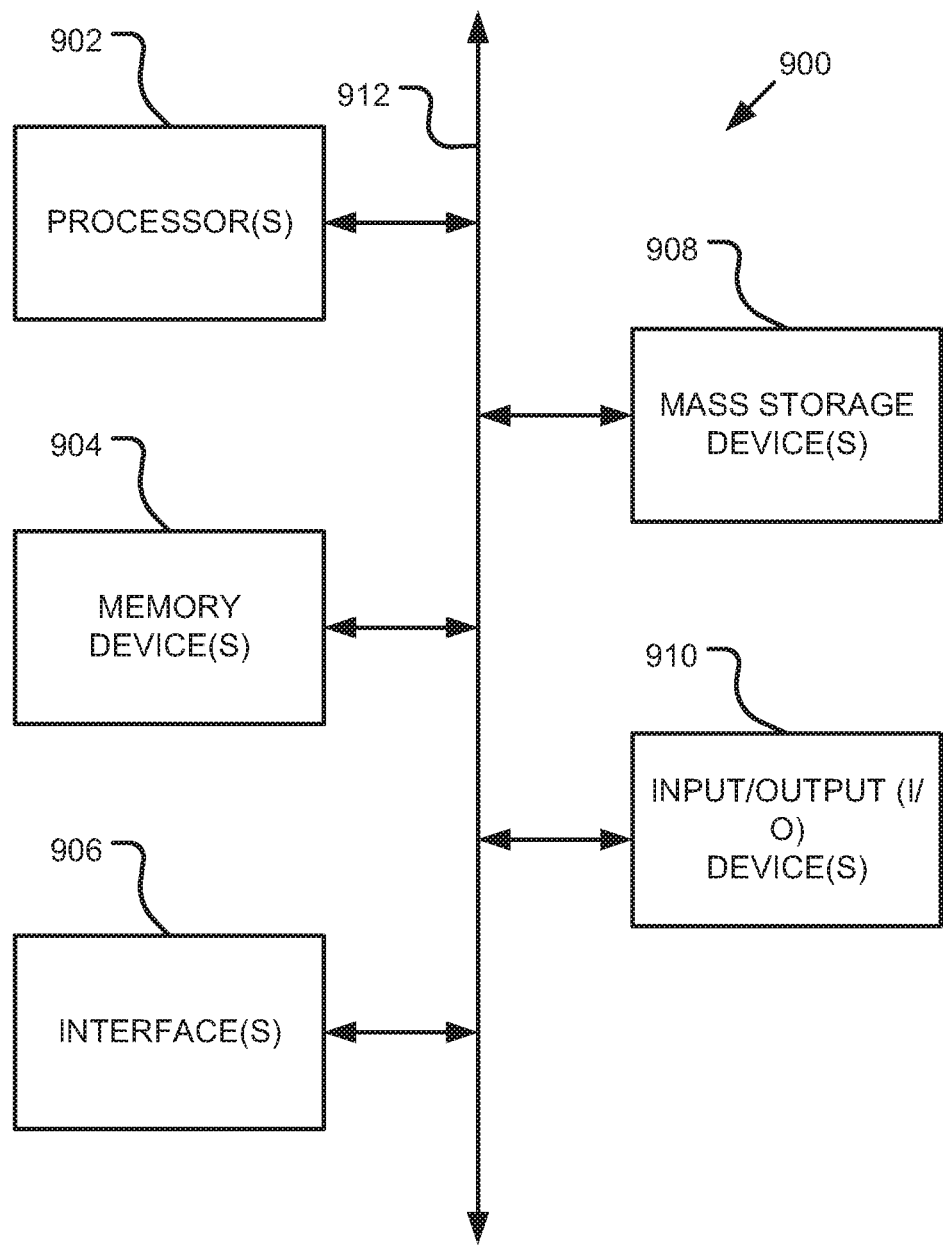
FIG. 9 is a block diagram depicting an example computing device or system consistent with one or more embodiments disclosed herein.

FIG. 9 is a block diagram depicting an example computing device 900. In some embodiments, computing device 900 is used to implement one or more of the systems and components discussed herein. For example, the computing device 900 may be used to implement one or more of the database service manager 102, components or modules of the database service manager such as the clustering maintenance module 230, and/or the components 702-712 of the clustering maintenance module 230. Further, computing device 900 may interact with any of the systems and components described herein. Accordingly, computing device 900 may be used to perform various procedures and tasks, such as those discussed herein. Computing device 900 can function as a server, a client or any other computing entity. Computing device 900 can be any of a wide variety of computing devices, such as a desktop computer, a notebook computer, a server computer, a handheld computer, a tablet, and the like.

Computing device 900 includes one or more processor(s) 902, one or more memory device(s) 904, one or more interface(s) 906, one or more mass storage device(s) 908, and one or more Input/Output (I/O) device(s) 910, all of which are coupled to a bus 912. Processor(s) 902 include one or more processors or controllers that execute instructions stored in memory device(s) 904 and/or mass storage device(s) 908. Processor(s) 902 may also include various types of computer-readable media, such as cache memory.

Memory device(s) 904 include various computer-readable media, such as volatile memory (e.g., random access memory (RAM)) and/or nonvolatile memory (e.g., read-only memory (ROM)). Memory device(s) 904 may also include rewritable ROM, such as Flash memory.

Mass storage device(s) 908 include various computer readable media, such as magnetic tapes, magnetic disks, optical disks, solid state memory (e.g., Flash memory), and so forth. Various drives may also be included in mass storage device(s) 908 to enable reading from and/or writing to the various computer readable media. Mass storage device(s) 908 include removable media and/or non-removable media.

I/O device(s) 910 include various devices that allow data and/or other information to be input to or retrieved from computing device 900. Example I/O device(s) 910 include cursor control devices, keyboards, keypads, microphones, monitors or other display devices, speakers, printers, network interface cards, modems, lenses, CCDs or other image capture devices, and the like.

Interface(s) 906 include various interfaces that allow computing device 900 to interact with other systems, devices, or computing environments. Example interface(s) 906 include any number of different network interfaces, such as interfaces to local area networks (LANs), wide area networks (WANs), wireless networks, and the Internet.

Bus 912 allows processor(s) 902, memory device(s) 904, interface(s) 906, mass storage device(s) 908, and I/O device(s) 910 to communicate with one another, as well as other devices or components coupled to bus 912. Bus 912 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 900, and are executed by processor(s) 902. Alternatively, the systems and procedures described herein can be implemented in hardware, or a combination of hardware, software, and/or firmware. For example, one or more application specific integrated circuits (ASICs) can be programmed to carry out one or more of the systems and procedures described herein. As used herein, the terms "module" or "component" are intended to convey the implementation apparatus for accomplishing a process, such as by hardware, or a combination of hardware, software, and/or firmware, for the purposes of performing all or parts of operations disclosed herein. The terms "module" or "component" are intended to convey independent in how the modules, components, or their functionality or hardware may be implemented in different embodiments.

Example Algorithm for Incremental Clustering

This algorithm aims to have LSMT-like behavior without any additional data structures, and also allowing fully incremental behavior. In one embodiment, this algorithm doesn't maintain any persistent data structures, supports multi-column clustering, converges eventual to fully sorted/clustered partitions for a table. By fully sorted/clustered we do not mean that files are in any particular order within a partition set, but that the partitions can be arranged such that their data, when concatenated forms a sorted sequence, or that pruning is optimal. The algorithm also easily decomposes into independent subtasks. The algorithm doesn't require a dataset to be fully sorted, that means pruning can find more partitions than needed. The following discussion uses the terms "file" and "partition" interchangeably since each column or partition may be stored in its own file and many of the operations are performed with respect to a column on which the data is clustered.

1. Find Width

The algorithm includes finding a file or partition's width. In subsequent portions of the algorithm, the width of the file or partition is used. With multi-dimensional keys, defining it can be tricky. Also, for non-uniform domains, the algorithm may need a width that is somewhat related to the actual value distribution, not necessarily part of the domain. There are at least two options for finding the width.

The first option converts value ranges a pseudo-equi-height histogram. This first option finds the longest sequence of partitions with non-decreasing values. This should give a good approximation of data distribution. Finding that sequence can be done by sorting the partitions, and then doing the following:

```
files = sort(files, by-EPs-MAX-value)
last_file = files[0]
sequence = [last_file]
for (int i = 1; i < sorted_files.size( ); i++) {
    if (files[i].min < last_file.max) // file overlaps with the last previous
        continue
    last_file = files[i]
    sequence.append(last_file)
}
```

By doing a binary search on the resulting sequence, the algorithm can find the file or partition's size with respect to that sequence. This can be used to determine how many partitions in the sequence overlap with a specific file/partition. In one embodiment, the file or partition may be stored with the number of records in the partition as a metric. This might help with some "smaller" partitions and make it a bit more precise. This procedure gives each partition a value 1 . . . N, where N is the length of the sequence. In a fully sorted case (assuming distinct values), the width of each partition will be 1 (narrow partitions). If new random non-sorted partitions are subsequently added, assuming they span most of the range that is being used overall, its size will be N (wide partitions). If there is a fully sorted sequence of 1000 partitions, 10 unsorted partitions are inserted, the partitions/files will include 1000 partitions of width 1 and 10 partitions of width close to 1000. It may be noted that the "width" of the partition here is somewhat reverse to the size of a level in an LSMT. In other words, a very small LSMT groups would be very "wide" here. A less precise but simpler definition of width would be to take all mins and maxes and treat them as points and then sort them. Then width=number of these points that a partition covers.

The second, and more precise, option for determining a width includes building a range tree for all partitions. Then using the range tree, the second option computes how many parts of the partitions a given partition overlaps with.

2. Bucketize the Partitions by Width

Once we have partitions widths they can be bucketized (or grouped) into buckets of powers of N. For example, N could be 2. The intuition here is that we want to always merge partitions of similar width. The reason is that merging things on the same level increases the higher level. Also note that to increase the chance of doing useful work in subsequent steps, the files or partitions can be grouped into fewer buckets (e.g., powers of 4 or 16). The number of buckets roughly corresponds to how many overlapping partitions (files) that will not be merged at any time. That means that fewer buckets may help. At the same time, fewer buckets also means that partitions of vastly different width may be merged. This is a balance between the benefits of merging approximately equal width partitions versus the smaller amount of work for fewer buckets.

3. Find Merging Candidates

The algorithm includes finding files or partitions to merge. During merging, sorted partitions are merged into new sorted partitions. Finding the merging candidates may include, for each bucket or group starting with the widest, finding up to N partitions that are overlapping. N can be anything and may vary based on a resource budget allotted to the merging/incremental clustering. Finding overlapping partitions may be performed by putting a pair into a sorted sequence, and finding up to N partitions that overlap (e.g., ["start", file.min-val]["end", file.max-val]. These partitions, when merged, are guaranteed to form "narrower" partitions in the next algorithm iteration. Once one set is identified, additional sets may be identified until a budget is reached. Note that if a bucket has no (overlapping) partitions, the algorithm may move to a more "narrow" bucket to build some work opportunity. This may be a second-pass approach if the first, default pass doesn't find enough work.

Example Scenario

Let's use a simple scenario with 1-dimensional clustering keys. Notation: [0-7] represents a single partition, with values from 0 to 7. Starting point—a fully sorted sequence, plus a few "new" partitions. Assume our domain is hexadecimal digits.

[0-1] [2-3] [4-5] [6-7] [8-9] [A-B] [C-D] [E-F]//Sorted partitions sequence-note, order of partitions doesn't matter

[0-E] [2-F] [1-C] [2-D]/New partitions before "width" derivation

Note, the longest sorted sequence is 8 partitions. Here is the width for the new partitions:

[0------------------------------------E]    - width = 8
[2----------------------------------F]      - width = 7
[1-------------------------------C]         - width = 7
[2-------------------------------D]         - width = 6

Assuming these partitions are bucketized into the same bucket, and the N (how many we merge) is 2. The algorithm will choose partitions [0-E] and [1-C] to be merged, and then [2-D] and [2-F]. This will create four new partitions. Note, since the data is sorted as part of the algorithm, the range within each resulting partition is smaller:

[0-E]+[1-C]=>[0-7], [8-C]
[2-D]+[2-F]=>[2-8], [9-F]

Here is the situation after the first pass:
[0-1] [2-3] [4-5] [6-7] [8-9] [A-B] [C-D] [E-F]/Sorted files—width=ca. 1
[0-7] [8-C] [2-8] [9-F]/New merged files, width=ca. 4 (smaller value range)

Now, note that the "widths" of the new merged files (partitions) are "narrower" than they previously were. Now, adding new "unmerged" files with possibly contain "wide" range:

[1-E] [1-F] [0-D] [2-F]//Additional new added files, width=ca. 8

The algorithm will choose [1-E]+[1-F], [0-D]+[2-F] for merging from the width=8 bucket (e.g., log 2) and will creating new partitions [1-8]+[9-F] and [0-7][8-F]. But it will also merge overlapping partitions with width=4 (if there is sufficient budget), as follows:

[0-7]+[2-8]=>[0-4]+[5-8] and [8-C]+[9-F]=>[8-B]+[C-F]

After this pass, the situation of the partitions/files would be:

[0-1] [2-3] [4-5] [6-7] [8-9] [A-B] [C-D] [E-F]//Sorted files—width=ca. 1
[0-4] [5-8] [8-B] [C-F]//Files merged from width 4, now they have width 2
[1-8] [9-F] [0-8] [8-F]//Files merged from width 8, now they have width 4

Iterating the algorithm a few times, the partitions will eventually get to overlapping "narrow" partitions, which can be merged, resulting in a fully sorted sequence.

EXAMPLES

The following examples pertain to further embodiments.

Example 1 is method that includes storing table data for a table in a plurality of partitions, wherein each partition includes a portion of the table data for the table, and wherein the partitions are at least partially clustered based on one or more attributes (e.g., columns) in the table. The method includes creating one or more new partitions based on changes to the table, wherein at least one of the one or more new partitions overlap with each other or previous partitions resulting in a decrease in a degree of clustering of the table. The method includes determining that a degree of clustering of the table data is below a clustering threshold. The method also includes, in response to determining that the degree of clustering has fallen below the clustering threshold, reclustering one or more partitions of the table to improve the degree of clustering of the table.

In Example 2, the changes to the table of Example 1 include one or more changes based on one or more of a DML command and/or a trickle or bulk loading of table data.

In Example 3, the method of any of Examples 1-2 further includes determining the degree of clustering based one or more of: how many partitions overlap other partitions of the table; a degree of overlap of one or more partitions with other partitions of the table; determining how many partitions overlap for one or more attribute values; or determining an average depth of the table partitions. The depth includes a number of partitions that overlap for a specific attribute value for the one or more attributes.

In Example 4, determining that the table data is not sufficiently clustered as in any of Examples 1-3 includes determining that an execution time of an example query exceeds a threshold query execution length.

In Example 5, one or more of determining whether the degree of clustering of the table data is below the clustering threshold or reclustering in any of Examples 1-4 includes determining or reclustering as part of a background process.

In Example 6, the method of Example 1 further includes selecting two or more partitions as merge candidates.

In Example 7, selecting the two or more partitions as the merge candidates as in Example 6 includes selecting based on one or more of: the two or more partitions containing overlapping values for the one or more attributes; a degree to which the two or more partitions overlap; a width of values corresponding to the one or more attributes covered by the two or more partitions; and/or whether a partition is ideally clustered based on the one or more attributes.

In Example 8, selecting the two or more partitions as the merge candidates in any of Examples 6-7 includes ignoring partitions that do not overlap with any other partitions in the table and/or do not overlap beyond an overlap threshold with any other partitions in the table.

In Example 9, selecting the two or more partitions as the merge candidates in any of Examples 6-8 includes ignoring partitions including row values having an identical value for the one or more attributes.

In Example 10, the method of Example 6 further includes grouping partitions based on partition width, wherein the partition width is proportional to the range of values for the one or attributes within rows in the partition.

In Example 11, grouping partitions based on partition width in Example 10 includes grouping based on log base N of the partition width.

In Example 12, selecting the two or more partitions in any of Examples 10-11 includes selecting partitions from the same grouping.

In Example 13, the reclustering in any of Examples 1-12 includes incrementally improving clustering, and wherein reclustering the one or more partitions of the table data converges toward ideal partitioning based on reclustering iterations.

In Example 14, reclustering in any of Examples 1-13 includes reclustering based on a resource budget (e.g., reclustering resource budget).

In Example 15, reclustering in any of Examples 1-14 includes merging two or more partitions to generate two or more partitions with improved clustering.

In Example 16, includes the method of any of Examples 1-15, wherein before or after the changes to the table, the table is not ideally clustered. The table is ideally clustered if there does not exist any pair of partitions whose ranges overlap according to the one or more attributes and/or all rows of a partition for an attribute of the one or more attributes include the same value.

In Example 17, the method of any of Examples 1-16 includes performing incremental reclustering as part of a DML command.

In Example 18, the incremental reclustering as part of the DML command in Example 17 is limited based on a merge budget. The merge budget may limit one or more of a number of partitions that can be merged and/or an amount of allocated memory or processing resources to be used as part of the incremental reclustering.

Example 19 is an apparatus or system including means to perform a method as in any of Examples 1-18.

Example 20 is a machine-readable storage including machine-readable instructions which, when executed, implement a method or realize an apparatus of any of Examples 19.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. One or more programs that may implement or utilize the various techniques described herein may use an application programming interface (API), reusable controls, and the like. Such programs may be implemented in a high-level procedural, functional, object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components or modules, which are terms used to more particularly emphasize their implementation independence. For example, a component or module may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure.

What is claimed is:

1. A method comprising:
    creating one or more partitions based on changes to a table, at least one of the one or more partitions overlapping with respect to values of one or more attributes with at least one of another partition and a previous partition, the creating of the one or more partitions resulting in a decrease in a degree of clustering of the table;
    determining, after creating the one or more partitions, that the degree of clustering of the table is below a clustering threshold, the clustering threshold corresponding to a clustering ratio, the clustering ratio determined by at least a proportion of rows in a layout of the table that satisfy an ordering criteria based at least in part on a particular attribute of the one or more attributes, the determining that the degree of clustering of the table is below the clustering threshold comprising:
        determining an amount of new data added to the table,
        determining an amount of time that a first query should take to execute, the first query comprising a test query utilized for testing the degree of clustering of the table, and
        determining that an execution time of the first query exceeds a threshold query execution time corresponding to the amount of time that the first query should take to execute; and
    in response to the execution time of the first query exceeding the threshold query execution time, increasing the degree of clustering of the table by reclustering one or more partitions of the table.

2. The method of claim 1, further comprising:
    storing table data for a table in a plurality of partitions, each partition comprising a portion of table data for the table, the partitions being at least partially clustered based on one or more attributes in the table.

3. The method of claim 1, further comprising:
    determining the degree of clustering of the table based on one or more of a number of partitions that overlap other partitions of the table, a degree of overlap of one or more partitions with other partitions of the table, each individual depth of the partitions, or a distribution of depth of the partitions.

4. The method of claim 1, wherein determining that the degree of clustering of the table is below the clustering threshold comprises determining one or more of an amount, frequency, or type of data manipulation language (DML) statements performed on the table, and further comprising:
    creating one or more intermediate partitions for the new data added to the table; and
    merging the one or more intermediate partitions into a new partition.

5. The method of claim 1, wherein determining that the degree of clustering of the table is below the clustering threshold is based on pruning effectiveness during query compilation, and filter selectivity during query execution.

6. The method of claim 1, wherein reclustering comprises reclustering based on one or more of a reclustering resource budget, a number of partitions, data size, and available computing resources.

7. The method of claim 1, wherein reclustering comprises merging two or more partitions.

8. The method of claim 2, wherein the table being ideally clustered comprises, for each partition of the partitions of the table, the each partition comprises no overlaps with one or more other partitions in ranges of values corresponding to the one or more attributes.

9. The method of claim 2, wherein the table being ideally clustered comprises, for each partition of the partitions of the table, all rows of the each partition comprise the same value for an attribute of the one or more attributes.

10. A system, the system comprising:
    one or more processors; and
    a memory device storing instructions that, when executed by one or more processors, cause the one or more processors to perform operations comprising:
    creating one or more partitions based on changes to a table, at least one of the one or more partitions overlapping with respect to values of one or more attributes with at least one of another partition and a previous partition, the creating of the one or more partitions resulting in a decrease in a degree of clustering of the table;
    determining, after creating the one or more partitions, that the degree of clustering of the table is below a clustering threshold, the clustering threshold corresponding to a clustering ratio, the clustering ratio determined by at least a proportion of rows in a layout of the table that satisfy an ordering criteria based at least in part on a particular attribute of the one or more attributes, the determining that the degree of clustering of the table is below the clustering threshold comprising:
        determining an amount of new data added to the table,
        determining an amount of time that a first query should take to execute, the first query comprising a test query utilized for testing the degree of clustering of the table, and
        determining that an execution time the first query exceeds a threshold query execution time corresponding to the amount of time that the first query should take to execute; and
    in response to the execution time of the first query exceeding the threshold query execution time, increasing the degree of clustering of the table by reclustering one or more partitions of the table.

11. The system of claim 10, wherein the operations further comprise:
    storing table data for a table in a plurality of partitions, each partition comprising a portion of table data for the table, the partitions being at least partially clustered based on one or more attributes in the table.

12. The system of claim 10, wherein the operations further comprise:
    determining the degree of clustering of the table based on one or more of a number of partitions that overlap other partitions of the table, a degree of overlap of one or more partitions with other partitions of the table, each individual depth of the partitions, or a distribution of depth of the partitions.

13. The system of claim 10, wherein determining that the degree of clustering of the table is below the clustering threshold comprises determining one or more of an amount, frequency, or type of data manipulation language (DML) statements performed on the table, and further comprising:
creating one or more intermediate partitions for the new data added to the table; and
merging the one or more intermediate partitions into a new partition.

14. The system of claim 10, wherein determining that the degree of clustering of the table is below the clustering threshold is based on pruning effectiveness during query compilation, and filter selectivity during query execution.

15. The system of claim 10, wherein reclustering comprises reclustering based on one or more of a reclustering resource budget, a number of partitions, data size, and available computing resources.

16. The system of claim 10, wherein reclustering comprises merging two or more partitions.

17. The system of claim 11, wherein the table being ideally clustered comprises, for each partition of the partitions of the table, the each partition comprises no overlaps with one or more other partitions in ranges of values corresponding to the one or more attributes.

18. The system of claim 11, wherein the table being ideally clustered comprises, for each partition of the partitions of the table, all rows of the each partition comprise the same value for an attribute of the one or more attributes.

19. A non-transitory computer readable storage media storing instructions that, when executed by one or more processors, cause the one or more processors to perform operations comprising:
creating one or more partitions based on changes to a table, at least one of the one or more partitions overlapping with respect to values of one or more attributes with at least one of another partition and a previous partition, the creating of the one or more partitions resulting in a decrease in a degree of clustering of the table;
determining, after creating the one or more partitions, that the degree of clustering of the table is below a clustering threshold, the clustering threshold corresponding to a clustering ratio, the clustering ratio determined by at least a proportion of rows in a layout of the table that satisfy an ordering criteria based at least in part on a particular attribute of the one or more attributes, the determining that the degree of clustering of the table is below the clustering threshold comprising:
determining an amount of new data added to the table, determining an amount of time that a first query should take to execute, the first query comprising a test query utilized for testing the degree of clustering of the table, and
determining that an execution time of the first query exceeds a threshold query execution time; and
in response to the execution time of the first query exceeding the threshold query execution time, increasing the degree of clustering of the table by reclustering one or more partitions of the table.

20. The non-transitory computer readable storage media of claim 19, wherein the operations further comprise:
storing table data for a table in a plurality of partitions, each partition comprising a portion of table data for the table, the partitions being at least partially clustered based on one or more attributes in the table.

21. The non-transitory computer readable storage media of claim 19, wherein the operations further comprise:
determining the degree of clustering of the table based on one or more of a number of partitions that overlap other partitions of the table, a degree of overlap of one or more partitions with other partitions of the table, each individual depth of the partitions, or a distribution of depth of the partitions.

22. The non-transitory computer readable storage media of claim 19, wherein determining that the degree of clustering of the table is below the clustering threshold comprises determining one or more of an amount, frequency, or type of data manipulation language (DML) statements performed on the table, and further comprising:
creating one or more intermediate partitions for the new data added to the table; and
merging the one or more intermediate partitions into a new partition.

23. The non-transitory computer readable storage media of claim 19, wherein determining that the degree of clustering of the table is below the clustering threshold is based on pruning effectiveness during query compilation, and filter selectivity during query execution.

24. The non-transitory computer readable storage media of claim 19, wherein reclustering comprises reclustering based on one or more of a reclustering resource budget, a number of partitions, data size, and available computing resources.

25. The non-transitory computer readable storage media of claim 19, wherein reclustering comprises merging two or more partitions.

26. The non-transitory computer readable storage media of claim 20, wherein the table being ideally clustered comprises, for each partition of the partitions of the table, the each partition comprises no overlaps with one or more other partitions in ranges of values corresponding to the one or more attributes.

27. The non-transitory computer readable storage media of claim 20, wherein the table being ideally clustered comprises, for each partition of the partitions of the table, all rows of the each partition comprise the same value for an attribute of the one or more attributes.

* * * * *

UNITED STATES PATENT AND TRADEMARK OFFICE
CERTIFICATE OF CORRECTION

PATENT NO. : 11,100,142 B2
APPLICATION NO. : 17/030549
DATED : August 24, 2021
INVENTOR(S) : Cruanes et al.

Page 1 of 1

It is certified that error appears in the above-identified patent and that said Letters Patent is hereby corrected as shown below:

On the Title Page

On page 2, in Column 2, under "Other Publications", Line 23, delete "Rulesd" and insert --Rules-- therefor On page 2, in Column 2, under "Other Publications", Line 31, delete "Patentabilty" and insert --Patentability-- therefor Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*